(12) United States Patent
Takeda

(10) Patent No.: US 10,875,541 B2
(45) Date of Patent: Dec. 29, 2020

(54) VEHICLE CONTROL SYSTEM, VEHICLE CONTROL METHOD, AND VEHICLE CONTROL PROGRAM

(71) Applicant: HONDA MOTOR CO., LTD., Tokyo (JP)

(72) Inventor: Masanori Takeda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 33 days.

(21) Appl. No.: 16/069,588

(22) PCT Filed: Feb. 7, 2017

(86) PCT No.: PCT/JP2017/004369
§ 371 (c)(1),
(2) Date: Jul. 12, 2018

(87) PCT Pub. No.: WO2017/138517
PCT Pub. Date: Aug. 17, 2017

(65) Prior Publication Data
US 2019/0031202 A1    Jan. 31, 2019

(30) Foreign Application Priority Data
Feb. 12, 2016   (JP) ................................. 2016-025163

(51) Int. Cl.
*B60T 7/12*   (2006.01)
*B60T 8/171*   (2006.01)
(Continued)

(52) U.S. Cl.
CPC ............... *B60W 50/02* (2013.01); *B60T 7/12* (2013.01); *B60T 7/22* (2013.01); *B60T 8/00* (2013.01);
(Continued)

(58) Field of Classification Search
None
See application file for complete search history.

(56) References Cited

U.S. PATENT DOCUMENTS 9,550,494 B2 *   1/2017   Aso .................... B60W 30/0956
10,095,411 B2 *  10/2018  Park .................... G06F 12/0246
(Continued)

FOREIGN PATENT DOCUMENTS

| CN | 103747999 | 4/2014 |
| CN | 104037750 | 9/2014 |

(Continued)

OTHER PUBLICATIONS

International Search Report and Written Opinion for International Patent Application No. PCT/JP2017/004369 dated May 16, 2017, 13 pages.
(Continued)

*Primary Examiner* — Redhwan K Manwari
*Assistant Examiner* — Melanie J Patrick
(74) *Attorney, Agent, or Firm* — Amin, Turocy & Watson, LLP

(57) ABSTRACT

A vehicle control system includes: a first device that generates trajectory data indicating a future trajectory of a host vehicle and outputs the generated trajectory data; a second device that controls at least one of acceleration/deceleration and steering of the host vehicle on the basis of the trajectory data generated by the first device; and a third device that receives the trajectory data generated by the first device and writes the received trajectory data in a storage unit thereof, the third device being a device separate from at least the first device, wherein when an abnormality occurs in the trajectory data output by the first device, the second device controls at least one of acceleration/deceleration and steering of the host vehicle on the basis of the trajectory data
(Continued)

which has been received by the third device and written in the storage unit before the abnormality occurred.

10 Claims, 18 Drawing Sheets

(51) Int. Cl.
    *B60W 50/02*     (2012.01)
    *B62D 6/00*     (2006.01)
    *B60T 8/17*     (2006.01)
    *B60W 30/10*     (2006.01)
    *B60T 8/00*     (2006.01)
    *B62D 15/02*     (2006.01)
    *B60T 8/1755*     (2006.01)
    *B60T 7/22*     (2006.01)
    *B60W 10/18*     (2012.01)
    *B60W 10/20*     (2006.01)
    *B60W 30/08*     (2012.01)
    *B60W 30/12*     (2020.01)

(52) U.S. Cl.
    CPC ............... *B60T 8/17* (2013.01); *B60T 8/171* (2013.01); *B60T 8/17557* (2013.01); *B60W 10/18* (2013.01); *B60W 10/20* (2013.01); *B60W 30/10* (2013.01); *B62D 6/00* (2013.01); *B62D 15/025* (2013.01); *B62D 15/0255* (2013.01); *B62D 15/0265* (2013.01); *B60T 2201/022* (2013.01); *B60T 2201/087* (2013.01); *B60T 2250/00* (2013.01); *B60T 2260/02* (2013.01); *B60T 2270/402* (2013.01); *B60W 30/08* (2013.01); *B60W 30/12* (2013.01); *B60W 2520/06* (2013.01); *B60W 2710/18* (2013.01); *B60W 2710/20* (2013.01); *B60W 2720/24* (2013.01)

(56) References Cited

U.S. PATENT DOCUMENTS

| | | | | |
|---|---|---|---|---|
| 2001/0015912 | A1* | 8/2001 | Matsubara | G11C 16/0416 365/185.29 |
| 2015/0246678 | A1 | 9/2015 | Hauler | |
| 2015/0307095 | A1 | 10/2015 | Aso | |
| 2015/0344039 | A1* | 12/2015 | Amoh | B60W 50/035 701/1 |
| 2016/0107655 | A1* | 4/2016 | Desnoyer | B60W 50/14 701/23 |
| 2016/0114811 | A1* | 4/2016 | Matsuno | B60W 50/0225 701/23 |
| 2017/0212513 | A1* | 7/2017 | Iida | B60W 50/02 |

FOREIGN PATENT DOCUMENTS

| | | |
|---|---|---|
| CN | 105050859 | 11/2015 |
| DE | 102014212384 | 12/2015 |
| JP | 11-039586 | 2/1999 |
| JP | 2005-107693 | 4/2005 |
| JP | 2005-241303 | 9/2005 |
| JP | 2007-233573 | 9/2007 |
| JP | 2013-079068 | 5/2013 |
| JP | 2015-210720 | 11/2015 |
| JP | 2016-084093 | 5/2016 |

OTHER PUBLICATIONS

Japanese Office Action for Japanese Patent Application No. 2017-566949 dated Dec. 3, 2019.
Chinese Office Action for Chinese Patent Application No. 201780005707.3 dated Aug. 28, 2020.

* cited by examiner

| TRAJECTORY DATA | RECEPTION TIME | TRANSMISSION COMPLETION FLAG |
|---|---|---|
| K(0) | 11:01 03.189 | 1 |
| ... | 11:01 08.402 | 0 |
| K(n) | 11:01 13.059 | 0 |
| ... | ... | ... |

158

VEHICLE CONTROL SYSTEM, VEHICLE CONTROL METHOD, AND VEHICLE CONTROL PROGRAM

TECHNICAL FIELD

The present invention relates to a vehicle control system, a vehicle control method, and a vehicle control program.

This application claims the priority benefit of Japanese Patent Application No. 2016-025163, filed on Feb. 12, 2016, the contents of which are hereby incorporated by reference into the present application.

BACKGROUND ART

In recent years, research on technology for allowing a vehicle such as a four-wheeled vehicle to travel automatically has progressed.

In this regard, a vehicle travel control method executing processes including: a process of detecting an obstacle on the side in front of a host vehicle; a process of detecting a traveling state of the host vehicle; a process of generating a plurality of collision avoidance trajectories for causing the host vehicle to avoid colliding with the obstacle on the basis of the traveling state of the host vehicle; a process of detecting an operation on the host vehicle, of a driver; a process of selecting a collision avoidance trajectory corresponding to the operation on the host vehicle among the plurality of collision avoidance trajectories; and a process of controlling traveling of the host vehicle on the basis of the selected collision avoidance trajectory is known (for example, see Patent Literature 1).

CITATION LIST

Patent Literature

[Patent Literature 1] Japanese Unexamined Patent Application, First Publication No. 2013-079068

SUMMARY OF INVENTION

Technical Problem

However, in the conventional technology, when an abnormality occurs in a device that generates a trajectory for controlling the traveling of a vehicle, it may be necessary to stop the automatic driving mode immediately. Moreover, when the driving mode is controlled to be switched immediately to a manual driving mode in accordance with this, since there may not be enough time for switching, control that stops the vehicle may be necessary. Due to this, in the conventional technology, the costs for enhancing the safety of the device that generates trajectories may become higher than in conventional technology.

Embodiments of the present invention have been realized in view of such circumstances, and one of the objects thereof is to provide a vehicle control system, a vehicle control method, and a vehicle control program capable of terminating an automatic driving mode more smoothly.

Solution to Problem (1) A vehicle control system according to an embodiment of the present invention includes: a first device that generates trajectory data indicating a future trajectory of a host vehicle and outputs the generated trajectory data; a second device that controls at least one of acceleration/deceleration and steering of the host vehicle on the basis of the trajectory data generated by the first device; and a third device that receives the trajectory data generated by the first device and writes the received trajectory data in a storage unit thereof, the third device being a device separate from at least the first device, wherein when an abnormality occurs in the trajectory data output by the first device, the second device controls at least one of acceleration/deceleration and steering of the host vehicle on the basis of the trajectory data which has been received by the third device and written in the storage unit before the abnormality occurred.

(2) In Embodiment (1), the third device may stop storing the received trajectory data in the storage unit when it is detected that an abnormality has occurred in the trajectory data received from the first device.

(3) In Embodiment (1) or (2), the third device may stop receiving the trajectory data generated by the first device when it is detected that an abnormality has occurred in the trajectory data received from the first device.

(4) In Embodiment (2) or (3), the third device may relay the trajectory data output from the first device to output the trajectory data to the second device and detect an occurrence of an abnormality in the trajectory data on the basis of a content or a presence of the relayed trajectory data.

(5) In any one of Embodiments (1) to (4), the first device, the second device, and the third device may be connected via a communication line via which information being transmitted can be referred by a plurality of devices, the first device may output the trajectory data to the communication line, the second device may control at least one of acceleration/deceleration and steering of the host vehicle on the basis of the trajectory data transmitted via the communication line, and the third device may receive the trajectory data transmitted via the communication line, store the received trajectory data in the storage unit, and output the trajectory data stored in the storage unit to the communication line when an abnormality has occurred in the received trajectory data.

(6) In Embodiment (5), the third device may append information indicating that a priority is higher than a priority of information that the first device outputs to the communication line to the trajectory data stored in the storage unit and output the trajectory data to the communication line.

(7) In any one of Embodiments (1) to (6), the third device may generate additional trajectory data indicating a future trajectory later than a target future time point of the trajectory on the basis of the trajectory data received from the first device, and the third device may output the generated additional trajectory data to the second device in addition to the trajectory data received from the first device when an abnormality has occurred in the trajectory data received from the first device.

(8) In any one of Embodiments (1) to (7), when an abnormality has not occurred in the trajectory data received from the first device, the third device may continuously receive the trajectory data output from the first device and overwrite the received trajectory data in a predetermined area of the storage unit.

(9) In any one of Embodiments (1) to (8), the first device and the third device may include volatile memories, and the volatile memory included in the first device may have a larger storage capacity than the volatile memory included in the third device.

(10) A vehicle control method according to an embodiment of the present invention includes: generating, by a first device, trajectory data indicating a future trajectory of a host vehicle and output the generated trajectory data; controlling, by a second device, at least one of acceleration/deceleration and steering of the host vehicle on the basis of the trajectory data generated by the first device; receiving, by a third device, the trajectory data generated by the first device and write the received trajectory data in a storage unit thereof, the third device being a device separate from at least the first device; and when an abnormality occurs in the trajectory data output by the first device, controlling, by the second device, at least one of acceleration/deceleration and steering of the host vehicle on the basis of the trajectory data which has been received by the third device and written in the storage unit before the abnormality occurred.

(11) A vehicle control program according to an embodiment of the present invention includes: causing a first device to generate trajectory data indicating a future trajectory of a host vehicle and output the generated trajectory data; causing a second device to control at least one of acceleration/deceleration and steering of the host vehicle on the basis of the trajectory data generated by the first device; causing a third device to receive the trajectory data generated by the first device and write the received trajectory data in a storage unit thereof, the third device being a device separate from at least the first device; and when an abnormality occurs in the trajectory data output by the first device, causing the second device to control at least one of acceleration/deceleration and steering of the host vehicle on the basis of the trajectory data which has been received by the third device and written in the storage unit before the abnormality occurred.

Advantageous Effects of Invention

According to Embodiments (1), (4), (5), (8), (10), and (11), when an abnormality occurs in the trajectory data received from the first device, the second device automatically controls at least one of acceleration/deceleration and steering of the host vehicle on the basis of the trajectory data which has been received by the third device and written in the storage unit before the abnormality occurred. Therefore, it is possible to terminate the automatic driving mode more smoothly.

According to Embodiment (2), when it is detected that an abnormality has occurred in the trajectory data received from the first device, since storing of the received trajectory data in the storage unit is stopped, the second device does not automatically control at least one of acceleration/deceleration and steering of the host vehicle on the basis of the trajectory data generated after the abnormality occurred. As a result, it is possible to improve safety during traveling.

According to Embodiment (3), when it is detected that an abnormality has occurred in the information indicating the trajectory received from the first device, since receiving of the trajectory data generated by the first device is stopped, the second device does not automatically control at least one of acceleration/deceleration and steering of the host vehicle on the basis of the trajectory data generated after the abnormality occurred. As a result, it is possible to improve safety during traveling.

According to Embodiment (6), since the third device appends information indicating that the priority of the trajectory data is higher than that of the information that the first device outputs to the communication line to the trajectory data stored in the storage unit and outputs the trajectory data to the communication line, it is possible to terminate the automatic driving mode more smoothly.

According to Embodiment (7), since the third device generates additional trajectory data indicating a future trajectory later than a target future time point of the trajectory on the basis of the trajectory data received from the first device and stored in the storage unit and outputs the generated additional trajectory data to the second device in addition to the trajectory data received from the first device when an abnormality has occurred in the trajectory data received from the first device, it is possible to terminate the automatic driving mode more smoothly.

According to Embodiment (9), since the first device and the third device have volatile memories, and the volatile memory included in the first device has a larger storage capacity than the volatile memory included in the third device, it is possible to realize the third device at low cost.

DESCRIPTION OF EMBODIMENTS

Hereinafter, embodiments of a vehicle control system, a vehicle control method, and a vehicle control program according to the present invention will be described with reference to the drawings.

First Embodiment

[Vehicle Configuration]

Figure 1:
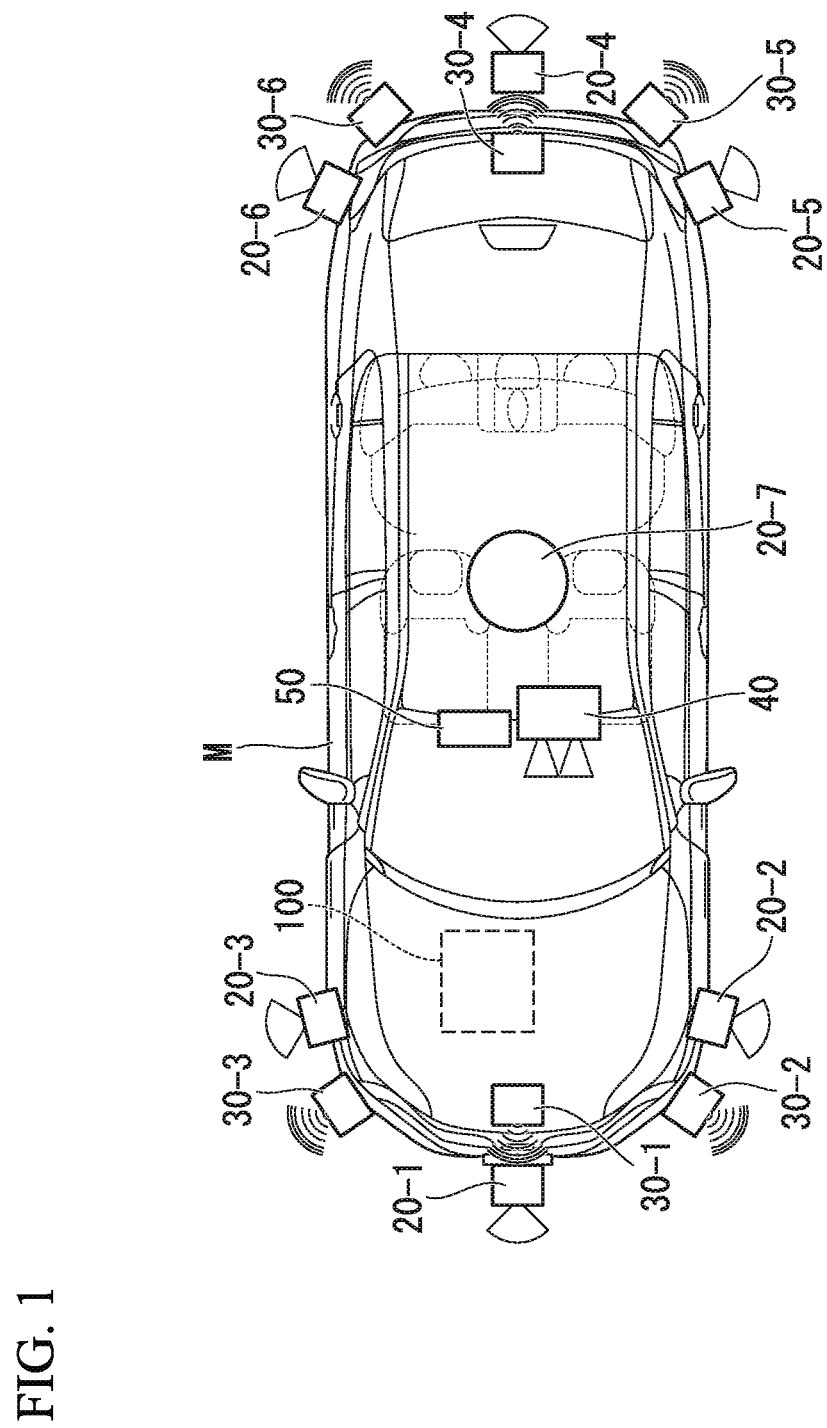
FIG. 1 is a diagram illustrating components of a vehicle on which a vehicle control system according to a first embodiment is mounted.

FIG. 1 is a diagram illustrating components of a vehicle (hereinafter referred to as a host vehicle M) on which a vehicle control system 100 according to a first embodiment is mounted. A vehicle on which the vehicle control system 100 is mounted is an automobile such as a two-wheeled automobile, a three-wheeled automobile, or a four-wheeled automobile, for example, and examples thereof include an automobile which uses an internal combustion engine such as a diesel engine or a gasoline engine as a power source, an electric automobile which uses a motor as a power source, and a hybrid automobile which uses an internal combustion engine and a motor as a power source. Moreover, the electric automobile is driven using electric power discharged by a battery such as, for example, a secondary battery, a hydrogen fuel cell, a metal fuel cell, or an alcohol fuel cell.

As illustrated in FIG. 1, sensors such as finders 20-1 to 20-7, radars 30-1 to 30-6, and a camera 40, a navigation device 50, and the vehicle control system 100 are mounted on the host vehicle M. The finders 20-1 to 20-7 use light detection and ranging or laser imaging detection and ranging (LIDAR) that measure scattered light of emission light to measure a distance to a target. For example, the finder 20-1 may be attached to a front grille or the like, and the finders 20-2 and 20-3 are attached to a side surface of a vehicle body, a door mirror, the inside of a head light, the vicinity of a side indicator light, or the like. The finder 20-4 is attached to a trunk lid or the like, and the finders 20-5 and 20-6 are attached to a side surface of the vehicle body, the inside of a tail lamp, or the like. The finders 20-1 to 20-6 may have a detection area which is approximately 150° with respect to a lateral direction, for example. Moreover, the finder 20-7 is attached to a roof lamp or the like. The finder 20-7 has a detection area which is at 360° with respect to a horizontal direction, for example.

The radars 30-1 and 30-4 are long-range millimeter-wave radars of which the detection area in a depth direction, for example, is wider than in other radars. Moreover, the radars 30-2, 30-3, 30-5, and 30-6 are mid-range millimeter-wave radars of which the detection area in the depth direction is narrower than the radars 30-1 and 30-4. Hereinafter, the finders 20-1 to 20-7 will be referred to simply as a "finder 20" when the finders are not particularly distinguished, and the radars 30-1 to 30-6 will be referred to simply as a "radar 30" when the radars are not particularly distinguished. The radar 30 detects an object according to a frequency modulated continuous wave (FM-CW) scheme, for example.

The camera 40 is a digital camera which uses a solid-state imaging device such as a charge coupled device (CCD) or a complementary metal oxide semiconductor (CMOS), for example. The camera 40 is attached to an upper portion of a front windshield or to a rear surface of a rear-view mirror. The camera 40 captures the images of the side in front of the host vehicle M periodically and repeatedly, for example.

The components illustrated in FIG. 1 are examples only, and some of the components may be omitted and other components may be added.

Figure 2:
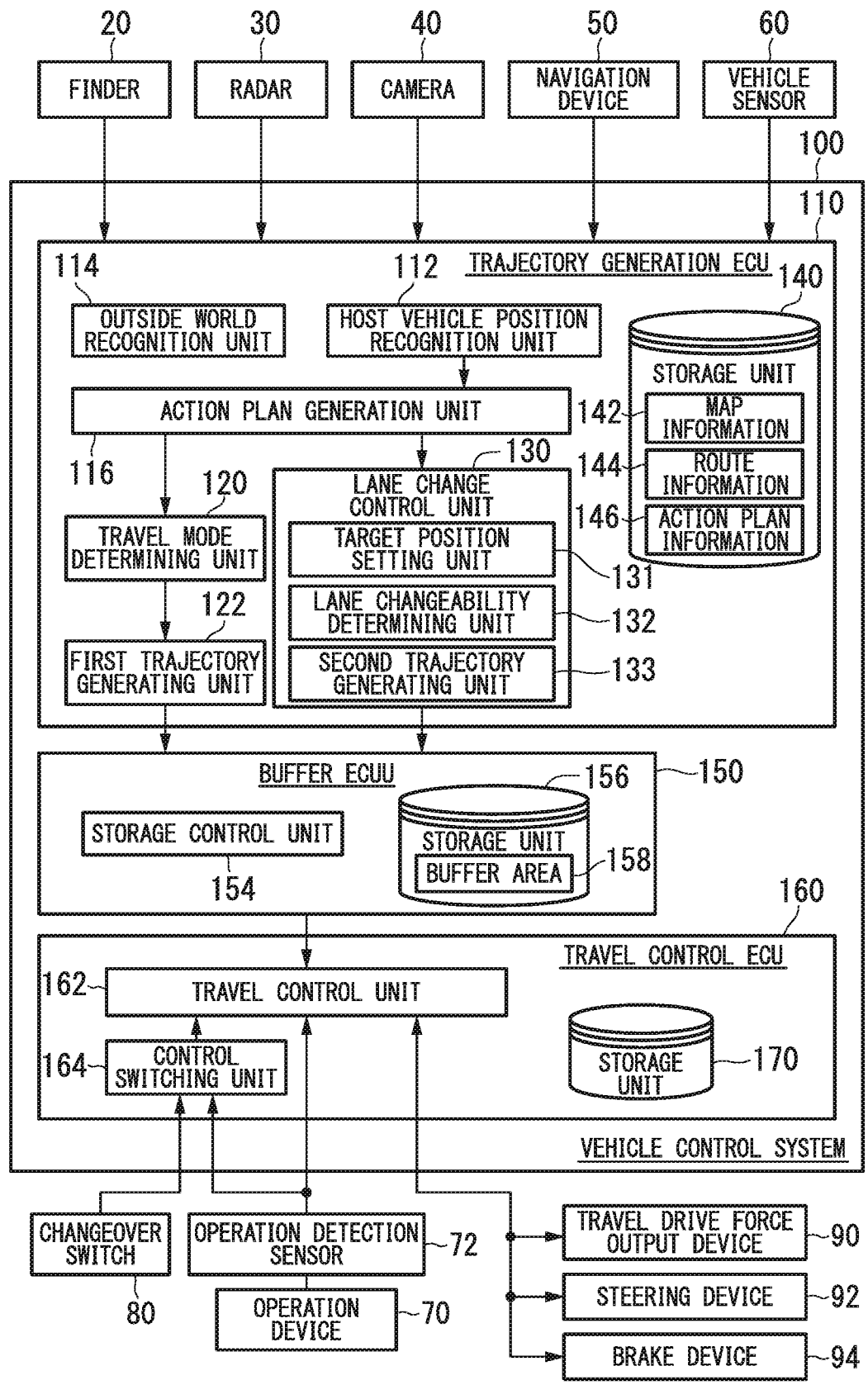
FIG. 2 is a diagram illustrating a functional configuration of a host vehicle, mainly of the vehicle control system according to the first embodiment.

FIG. 2 is a diagram illustrating a functional configuration of the host vehicle M, mainly of the vehicle control system 100 according to the first embodiment. In addition to the finder 20, the radar 30, and the camera 40, the navigation device 50, a vehicle sensor 60, an operation device 70, an operation detection sensor 72, a changeover switch 80, a travel drive force output device 90, a steering device 92, a brake device 94, and the vehicle control system 100 are mounted on the host vehicle M. These devices and apparatuses are connected to each other by a multiplex communication line such as a controller area network (CAN) communication line, a serial communication line, a wireless communication line, and the like.

The navigation device 50 has a global navigation satellite system (GNSS) receiver, map information (navigation map), a touch panel-type display device functioning as a user interface, a speaker, a microphone, and the like. The navigation device 50 identifies the position of the host vehicle M with the aid of the GNSS receiver and derives a route from the position to a destination designated by the user. The route derived by the navigation device 50 is stored in a storage unit 140 as route information 144. The position of the host vehicle M may be identified or compensated by an inertial navigation system (INS) which uses the output of the vehicle sensor 60. Moreover, the navigation device 50 provides guidance for a route to a destination via sound and navigation display when the vehicle control system 100 is operating in a manual driving mode. A configuration for identifying the position of the host vehicle M may be provided independently from the navigation device 50. Moreover, the navigation device 50 may be realized by one function of a terminal device such as a smartphone or a tablet terminal possessed by a user, for example. In this case, the terminal device and the vehicle control system 100 transmit and receive information wirelessly or by cable communication.

The vehicle sensor 60 may be a vehicle speed sensor that detects a vehicle speed, an acceleration sensor that detects an acceleration, a yaw-rate sensor that detects an angular speed around a vertical axis, and an azimuth sensor that detects a direction of the host vehicle M.

The travel drive force output device 90 includes an engine and an engine electronic control unit (ECU) that controls the engine when the host vehicle M is an automobile which uses an internal combustion engine as a power source, includes a travel motor and a motor ECU that controls the travel motor when the host vehicle M is an electric automobile which uses a motor as a power source, and includes an engine, an engine ECU, a travel motor, and a motor ECU when the host vehicle M is a hybrid automobile. When the travel drive force output device 90 includes an engine only, the engine ECU adjusts a throttle opening, a shift step, and the like of the engine according to information input from a travel control unit 162 and outputs a travel drive force (torque) for allowing the vehicle to travel. Moreover, when the travel drive force output device 90 includes a travel motor only, the motor ECU adjusts a duty ratio of a PWM signal supplied to the travel motor according to information input from the travel control unit 162 and outputs the travel drive force. Moreover, when the travel drive force output device 90 includes an engine and a travel motor only, both the engine ECU and the motor ECU control the travel drive force in cooperation according to information input from the travel control unit 162.

The steering device 92 includes an electric motor, a steering torque sensor, a steering angle sensor, and the like, for example. The electric motor applies a force with respect to a rack-and-pinion function or the like to change the direction of a steering wheel, for example. The steering torque sensor detects a torsion of a torsion bar when a steering wheel is operated as a steering torque (steering force), for example. The steering angle sensor detects a steering angle (or a steer angle), for example.

The steering device 92 drives the electric motor according to information input from the travel control unit 162 to change the direction of the steering wheel.

The brake device 94 is an electric servo brake device that includes a brake caliper, a cylinder that transmits hydraulic pressure to the brake caliper, an electric motor that generates hydraulic pressure in the cylinder, and a brake control unit. The brake control unit of the electric servo brake device controls the electric motor according to information input from the travel control unit 162 so that a brake torque corresponding to a brake operation is output to respective wheels. The electric servo brake device may include a backup mechanism for transmitting the hydraulic pressure generated by an operation of the brake pedal to the cylinder via a master cylinder. The brake device 94 is not limited to an electric servo brake device and may be an electronically controlled hydraulic brake device. The electronically controlled hydraulic brake device controls an actuator according to information input from the travel control unit 162 to transmit the hydraulic pressure of the master cylinder to the cylinder. Moreover, the brake device 94 may include a regenerative brake. The regenerative brake uses electric power generated by a travel motor included in the travel drive force output device 90.

The operation device 70 includes an acceleration pedal, a steering wheel, a brake pedal, a shift lever, and the like, for example. An operation detection sensor 72 that detects the presence and the amount of an operation of a driver is attached to the operation devices 70. The operation detection sensor 72 includes an acceleration opening sensor, a steering torque sensor, a brake sensor, a shift position sensor, and the like, for example. The operation detection sensors 72 may output an accelerator opening degree, a steering torque, a brake pedal depression amount, a shift position, and the like to the travel control unit 162 as detection results. Instead of this, the detection results of the operation detection sensor 72 may be output directly to the travel drive force output device 90, the steering device 92, or the brake device 94.

The changeover switch 80 is a switch operated by a driver or the like. The changeover switch 80 may be a mechanical switch provided on a steering wheel, a trim (a dashboard), or the like, for example, and may be a graphical user interface (GUI) switch provided in a touch panel of the navigation device 50. The changeover switch 80 receives an operation of a driver or the like, generates a control mode designation signal for designating a control mode of the travel control unit 162 as an automatic driving mode or a manual driving mode, and outputs the control mode designation signal to a control switching unit 164. As described above, the automatic driving mode is a driving mode in which a vehicle travels in a state in which a driver does not perform operations (or an operation amount is smaller or an operation frequency is lower than in the manual driving mode). More specifically, the automatic driving mode is a driving mode in which some or all of the travel drive force output device 90, the steering device 92, and the brake device 94 are controlled on the basis of an action plan.

[Configuration of Vehicle Control System]

Hereinafter, the vehicle control system 100 will be described. The vehicle control system 100 includes a trajectory generation ECU 110, the buffer ECU 150, and the travel control ECU 160, for example. At least the trajectory generation ECU 110 and the buffer ECU 150 are configured as separate units that are different from each other. Separate units may mean that processors included in the respective ECUs are configured as different chips (chipsets) and may mean that a communication line is present between two ECUs, for example. Moreover, separate units may mean that the respective ECUs are provided independently in a resin package, a metal package, a ceramic package, or the like and may mean that the respective ECUs are mounted in different print board. Moreover, the travel control ECU 160 may be configured as a separate unit different from the trajectory generation ECU 110 and the buffer ECU 150. In the present embodiment, the trajectory generation ECU 110, the buffer ECU 150, and the travel control ECU 160 being configured as separate units will be illustrated.

The trajectory generation ECU 110 includes a host vehicle position recognition unit 112, an outside world recognition unit 114, an action plan generation unit 116, a travel mode determining unit 120, a first trajectory generating unit 122, a lane change control unit 130, and the storage unit 140. Some or all of the host vehicle position recognition unit 112, the outside world recognition unit 114, the action plan generation unit 116, the travel mode determining unit 120, the first trajectory generating unit 122, and the lane change control unit 130 may be realized when a processor such as a central processing unit (CPU) executes a program stored in the storage unit 140. Moreover, some or all of these components may be realized by hardware such as a large scale integration (LSI) or an application specific integrated circuit (ASIC). The trajectory generation ECU 110 is an example of a "first device".

The storage unit 140 may be realized by a nonvolatile storage medium such as a read only memory (ROM), a flash memory, or a hard disk drive (HDD) and a volatile storage medium such as a random access memory (RAM) or a register. A program executed by a processor may be stored in a nonvolatile storage medium of the storage unit 140 in advance and may be downloaded from an external device via an onboard Internet facility or the like. Moreover, the program may be installed in the storage unit 140 when a portable storage medium having the program stored therein is attached to a drive device (not illustrated).

The buffer ECU 150 includes a storage control unit 154 and a storage unit 156, for example. The storage control unit 154 may be realized when a processor such as a CPU executes a program and may be realized by hardware such as an LSI or an ASIC. Moreover, the storage control unit 154 may be realized by hardware that performs direct memory access (DMA). The buffer ECU 150 is an example of a "third device".

The storage unit 156 may be realized by a nonvolatile storage medium such as a ROM, a flash memory, or an HDD and a volatile storage medium such as a RAM or a register. A program executed by a processor may be stored in a nonvolatile storage medium of the storage unit 156 in advance and may be downloaded from an external device via an onboard Internet facility or the like. Moreover, the program may be installed in the storage unit 156 when a portable storage medium having the program stored therein is attached to a drive device (not illustrated).

A storage capacity of a RAM included in the storage unit 156 is smaller than a storage capacity of a RAM included in the storage unit 140 of the trajectory generation ECU 110. This is because the number of functions required for the buffer ECU 150 is smaller than the number of functions required for the trajectory generation ECU 110. Moreover, the storage capacity of the RAM included in the storage unit 156 may be smaller than the storage capacity of the RAM included in a storage unit 170 of the travel control ECU 160.

The travel control ECU 160 includes the travel control unit 162, the control switching unit 164, and the storage unit 170, for example. The travel control ECU 160 may be realized when a processor such as a CPU executes s program. Moreover, some or all of these components may be realized by hardware such as an LSI or an ASIC. The travel control ECU 160 is an example of a "second device".

The storage unit 170 may be realized by a nonvolatile storage medium such as a ROM, a flash memory, or an HDD and a volatile storage medium such as a RAM or a register. The program executed by the processor may be stored in a nonvolatile storage medium of the storage unit 170 in advance and may be downloaded from an external device via an onboard Internet facility or the like. Moreover, the program may be installed in the storage unit 170 when a portable storage medium having the program stored therein is attached to a drive device (not illustrated).

The host vehicle position recognition unit 112 recognizes a lane (a traveling lane) along which the host vehicle M travels and a relative position of the host vehicle M in relation to the traveling lane on the basis of the map information 142 stored in the storage unit 170 and the information input from the finder 20, the radar 30, the camera 40, the navigation device 50, or the vehicle sensor 60. The map information 142 is map information having higher accuracy than the navigation map included in the navigation device 50, for example, and includes information on the center of a lane or information on the boundaries of a lane. More specifically, the map information 142 includes road information, traffic regulations information, address information (an address and a zip code), facility information, telephone number information, and the like. The road information includes information indicating the type of a road such as an expressway, a toll road, a national highway, or a public road and information on the number of lanes of a road, a width of each lane, a gradient of a road, the position of a road (3-dimensional coordinates including a latitude, a longitude, and a height), a curvature of a curve of a lane, the positions of merging and junction points of a lane, and signs provided on a road. The traffic regulation information includes information of blocking of a lane due to roadwork, traffic accidents, congestion, and the like.

Figure 3:
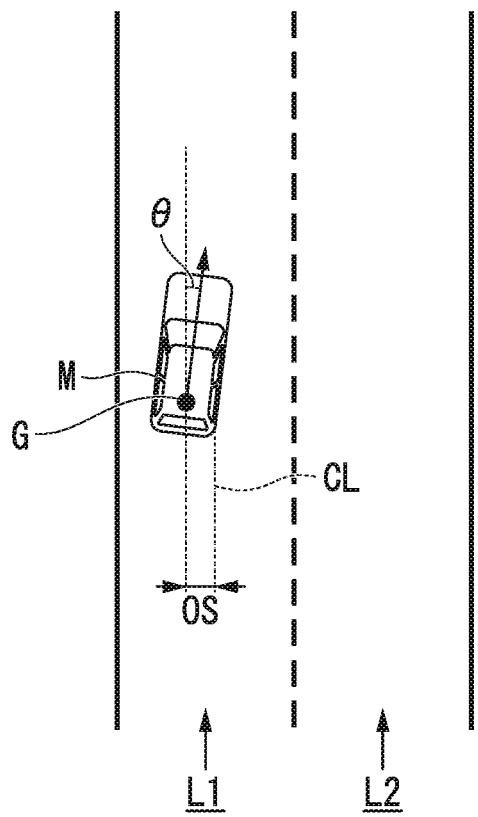
FIG. 3 is a diagram illustrating how a host vehicle position recognition unit recognizes a relative position of a host vehicle in relation to a traveling lane.

FIG. 3 is a diagram illustrating how the host vehicle position recognition unit 112 recognizes a relative position of the host vehicle M in relation to a traveling lane L1. The host vehicle position recognition unit 112 recognizes a deviation OS of a reference point G (for example, the center of gravity) of the host vehicle M from a traveling lane center CL and an angle θ between a traveling direction of the host vehicle M and an extension line of the traveling lane center CL as the relative position of the host vehicle M in relation to the traveling lane L1. Instead of this, the host vehicle position recognition unit 112 may recognize the position or the like of the reference point of the host vehicle M in relation to either lateral end of the host lane L1 as the relative position of the host vehicle M in relation to the traveling lane.

The outside world recognition unit 114 recognizes the position of a neighboring vehicle and the state thereof such as a speed, an acceleration, or the like on the basis of information input from the finder 20, the radar 30, the camera 40, and the like. A neighboring vehicle in the present embodiment is a vehicle that is traveling around the host vehicle M and a vehicle that is traveling in the same direction as the host vehicle M. The position of a neighboring vehicle may be represented by a representative point such as the center of gravity or a corner of the other vehicle and may be represented by an area represented by an outline of the other vehicle. The "state" of the neighboring vehicle may include information indicating whether a neighboring vehicle is changing an acceleration or lane (or is trying to change lane) on the basis of the information input from various apparatuses. Moreover, the outside world recognition unit 114 may recognize the position of a guard rail, a telegraph pole, a parked vehicle, a pedestrian, and other objects as well as neighboring vehicles.

The action plan generation unit 116 generates an action plan in a predetermined segment. The predetermined segment is a segment that passes through a toll road such as an expressway within the route derived by the navigation device 50, for example. Without being limited thereto, the action plan generation unit 116 may generate the action plan with respect to an arbitrary segment.

The action plan includes a plurality of events executed sequentially, for example. Examples of the event include a deceleration event of decelerating the host vehicle M, an acceleration event of accelerating the vehicle M, a lane keeping event of causing the host vehicle M to travel so as not to deviate from a traveling lane, a lane changing event of changing a traveling lane, a passing event of causing the host vehicle M to pass a preceding vehicle, a diverging event of causing the host vehicle M to change lane to a desired lane at a junction point or travel without deviating from the present traveling lane, and a merging event of accelerating or decelerating the host vehicle M at a lane merging point to change a traveling lane. For example, when a junction (a junction point) is present in a toll road (for example, an expressway or the like), the vehicle control system 100 needs to change or maintain a lane so that the host vehicle M travels in the direction for a destination in an automatic driving mode. Therefore, when it is determined that a junction is present on a route by referring to the map information 142, the action plan generation unit 116 sets a lane changing event for changing a lane to a desired lane in which the host vehicle M can travel in the direction for a destination in a segment from the present position (the present coordinates) of the host vehicle M to the position (the coordinates) of the junction. The information indicating the action plan generated by the action plan generation unit 116 is stored in the storage unit 140 as action plan information 146.

Figure 4:
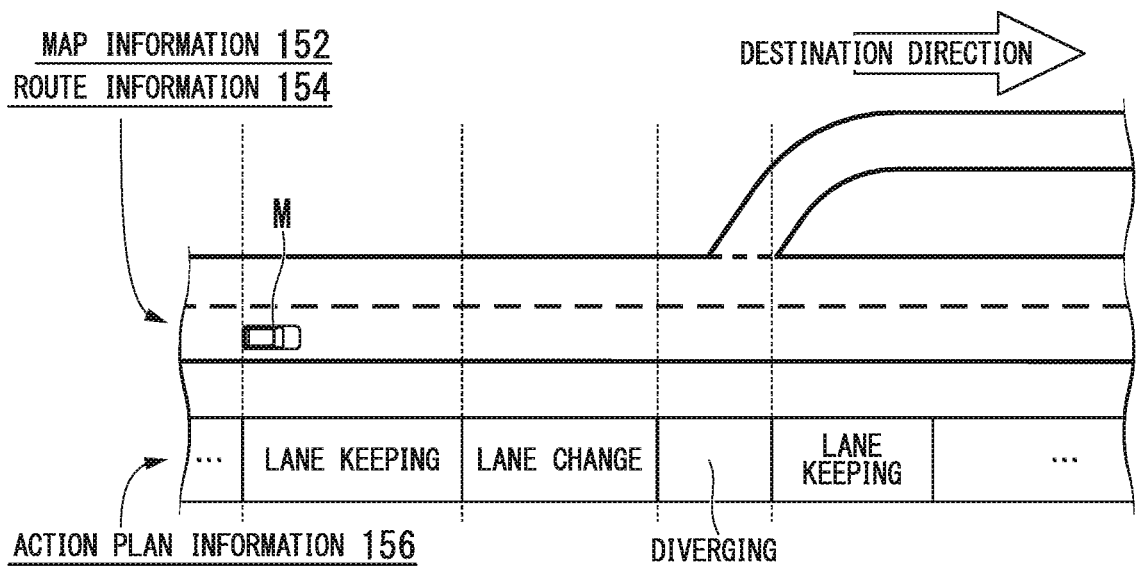
FIG. 4 is a diagram illustrating an example of an action plan generated for a certain segment.

FIG. 4 is a diagram illustrating an example of an action plan generated for a certain segment. As illustrated in FIG. 4, the action plan generation unit 116 classifies situations occurring when the host vehicle M travels along a route to a destination and generates an action plan so that events based on the individual situations are executed. The action plan generation unit 116 may change the action plan dynamically according to a change in the situation of the host vehicle M.

The action plan generation unit 116 may change (update) the generated action plan on the basis of an outside state recognized by the outside world recognition unit 114, for example. Generally, the outside state changes constantly while a vehicle is traveling. In particular, when the host vehicle M is traveling on a road including a plurality of lanes, the distance between the host vehicle M and other vehicles relatively changes. For example, when a preceding vehicle brakes abruptly and decelerates or a vehicle traveling on an adjacent lane cuts in front of the host vehicle M, the host vehicle M has to travel while changing the speed and the lane appropriately in harmony with a behavior of a preceding vehicle or a behavior of a vehicle on an adjacent lane. Therefore, the action plan generation unit 116 may change events set for respective control segments according to such a change in the outside state as described above.

Specifically, when the speed of the other vehicle recognized by the outside world recognition unit 114 during traveling of the host vehicle exceeds a threshold or a moving direction of the other vehicle traveling on a lane adjacent to the host lane is directed to the host lane direction, the action plan generation unit 116 may change events set for a driving segment along which the host vehicle M is scheduled to travel. For example, when events are set so that a lane changing event is executed subsequently to a lane keeping event, and it is determined by the recognition result of the outside world recognition unit 114 that a vehicle is traveling at a speed equal to or higher than a threshold from the side behind a lane change destination during the lane keeping event, the action plan generation unit 116 changes an event subsequent to the lane keeping event from the lane changing event to a deceleration event, a lane keeping event, or the like. In this way, the vehicle control system 100 can cause the host vehicle M to avoid colliding with a vehicle at the lane change destination. As a result, even when a change occurs in the outside state, the vehicle control system 100 can allow the host vehicle M to travel in an automatic driving mode safely.

[Lane Keeping Event]

The travel mode determining unit 120 determines a travel mode among constant-speed traveling, a following travel, a decelerating travel, a curve travel, an obstacle avoidance travel when a lane keeping event included in the action plan is executed by the travel control unit 162. For example, the travel mode determining unit 120 determines a constant-speed traveling as a travel mode when another vehicle is not present on the side in front of the host vehicle. Moreover, the travel mode determining unit 120 determines a following travel as a travel mode when the host vehicle follows a preceding vehicle. Moreover, the travel mode determining unit 120 determines a decelerating travel as a travel mode when deceleration of a preceding vehicle is recognized by the outside world recognition unit 114 or the host vehicle performs an event such as stopping or parking. Moreover, the travel mode determining unit 120 determines a curve travel as a travel mode when the outside world recognition unit 114 has recognized that the host vehicle M has arrived at a curved road. Moreover, the travel mode determining unit 120 determines an obstacle avoidance travel as a travel mode when the outside world recognition unit 114 has recognized that an obstacle is present on the side in front of the host vehicle M.

The first trajectory generating unit 122 generates a trajectory on the basis of the travel mode determined by the travel mode determining unit 120. A trajectory is a set (a trajectory) of points obtained by sampling, at predetermined time intervals, future target positions at which the host vehicle M is expected to arrive when the host vehicle M travels on the basis of the travel mode determined by the travel mode determining unit 120. Hereinafter, these points are sometimes referred to as trajectory points. The first trajectory generating unit 122 outputs information (hereinafter referred to as trajectory data) indicating the generated trajectory to the buffer ECU 150.

Figure 5A:
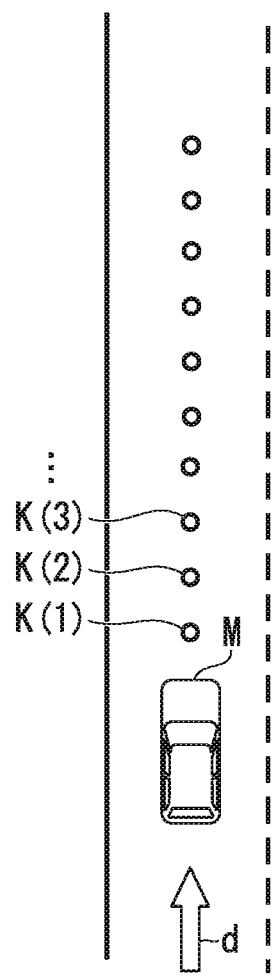
FIG. 5A is a diagram illustrating an example of a trajectory generated by a first trajectory generating unit.

FIGS. 5A to 5D are diagrams illustrating examples of a trajectory generated by the first trajectory generating unit 122. As illustrated in FIG. 5A, for example, the first trajectory generating unit 122 sets future target positions K(1), K(2), K(3), . . . as the trajectory of the host vehicle M using the present position of the host vehicle M as a reference whenever a predetermined time interval Δt has elapsed from the present time. Hereinafter, these target positions will be referred to simply as a "target position K" when the positions are not distinguished. For example, the number of target positions K is determined according to a target time T. For example, when the target time T is 5 seconds, the first trajectory generating unit 122 sets the target position K on the central line of the traveling lane at predetermined time intervals Δt (for example, 0.1 seconds) in the five seconds and determines an arrangement interval of the plurality of target positions K on the basis of the travel mode. The first trajectory generating unit 122 may derive the central line of the traveling lane from information such as, for example, the width of a lane included in the map information 142 and may acquire the central line from the map information 142 when the central line is included in advance in the map information 142.

Figure 5B:
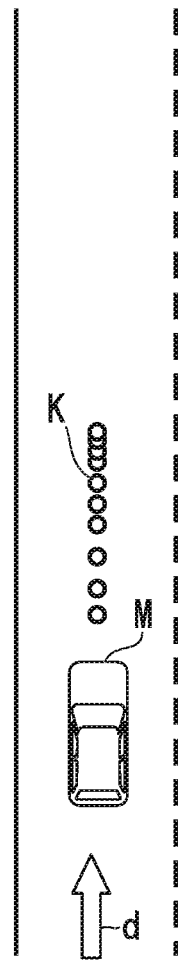
FIG. 5B is a diagram illustrating an example of a trajectory generated by a first trajectory generating unit.

For example, when a constant-speed traveling is determined as the travel mode by the travel mode determining unit 120, the first trajectory generating unit 122 sets a plurality of target positions K at equal intervals to generate a trajectory as illustrated in FIG. 5A. Moreover, when a deceleration travel is determined as the travel mode by the travel mode determining unit 120 (including a case in which a preceding vehicle decelerates in following travel), the first trajectory generating unit 122 generates a trajectory such that the earlier the arrival time of the target position K, the wider becomes the interval, and the later the arrival time of the target position K, the narrower becomes the interval as illustrated in FIG. 5B. By doing so, since the target position K of which the arrival time of the host vehicle M is later gets closer to the present position of the host vehicle M, the travel control unit 162 to be described later decelerates the host vehicle M.

Figure 5C:
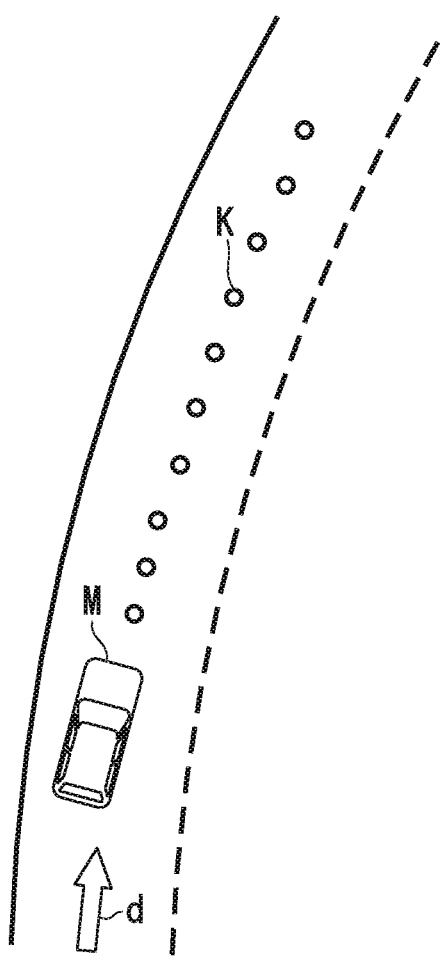
FIG. 5C is a diagram illustrating an example of a trajectory generated by a first trajectory generating unit.
Figure 5D:
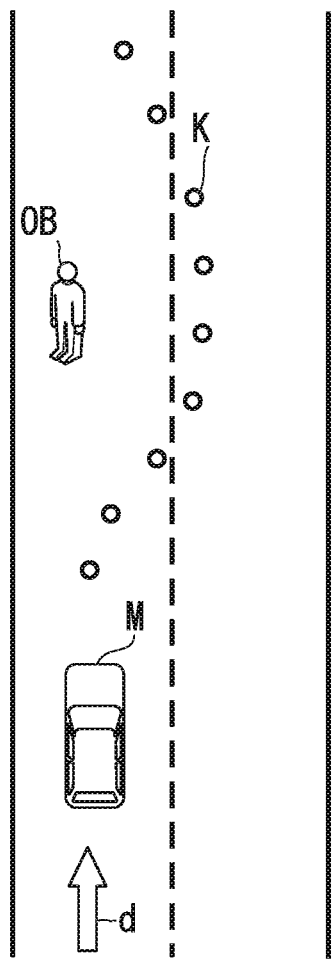
FIG. 5D is a diagram illustrating an example of a trajectory generated by a first trajectory generating unit.

As illustrated in FIG. 5C, when the road is a curved road, the travel mode determining unit 120 determines a curve travel as the travel mode. In this case, the first trajectory generating unit 122 arranges the plurality of target positions K while changing the lateral position (the position in a lane width direction) with respect to the traveling direction of the host vehicle M according to the curvature of the road, for example, to generate a trajectory. Moreover, as illustrated in FIG. 5D, when an obstacle OB such as a person or a stopped vehicle is present on a road on the side in front of the host vehicle M, the travel mode determining unit 120 determines an obstacle avoidance travel as the travel mode. In this case, the first trajectory generating unit 122 arranges the plurality of target positions K so as to travel while avoiding the obstacle OB to generate a trajectory.

[Lane Changing Event]

The lane change control unit 130 performs control when a lane changing event included in the action plan is performed by the travel control unit 162. The lane change control unit 130 includes a target position setting unit 131, a lane changeability determining unit 132, and a second trajectory generating unit 133, for example. The lane change control unit 130 may perform control to be described later when a diverging event or a merging event is performed by the travel control unit 162 without being limited to a lane changing event.

The target position setting unit 131 sets a target position TA when the host vehicle changes its lane to a lane (an adjacent lane) on which the host vehicle has to travel. The target position TA is a relative position set between two neighboring vehicles selected in the adjacent lane, for example. Hereinafter, a vehicle immediately before the target position TA among the "two neighboring vehicles" traveling on the adjacent lane will be referred to as a front reference vehicle mB. Moreover, a vehicle traveling immediately after the target position TA will be referred to as a rear reference vehicle mC.

Figure 6:
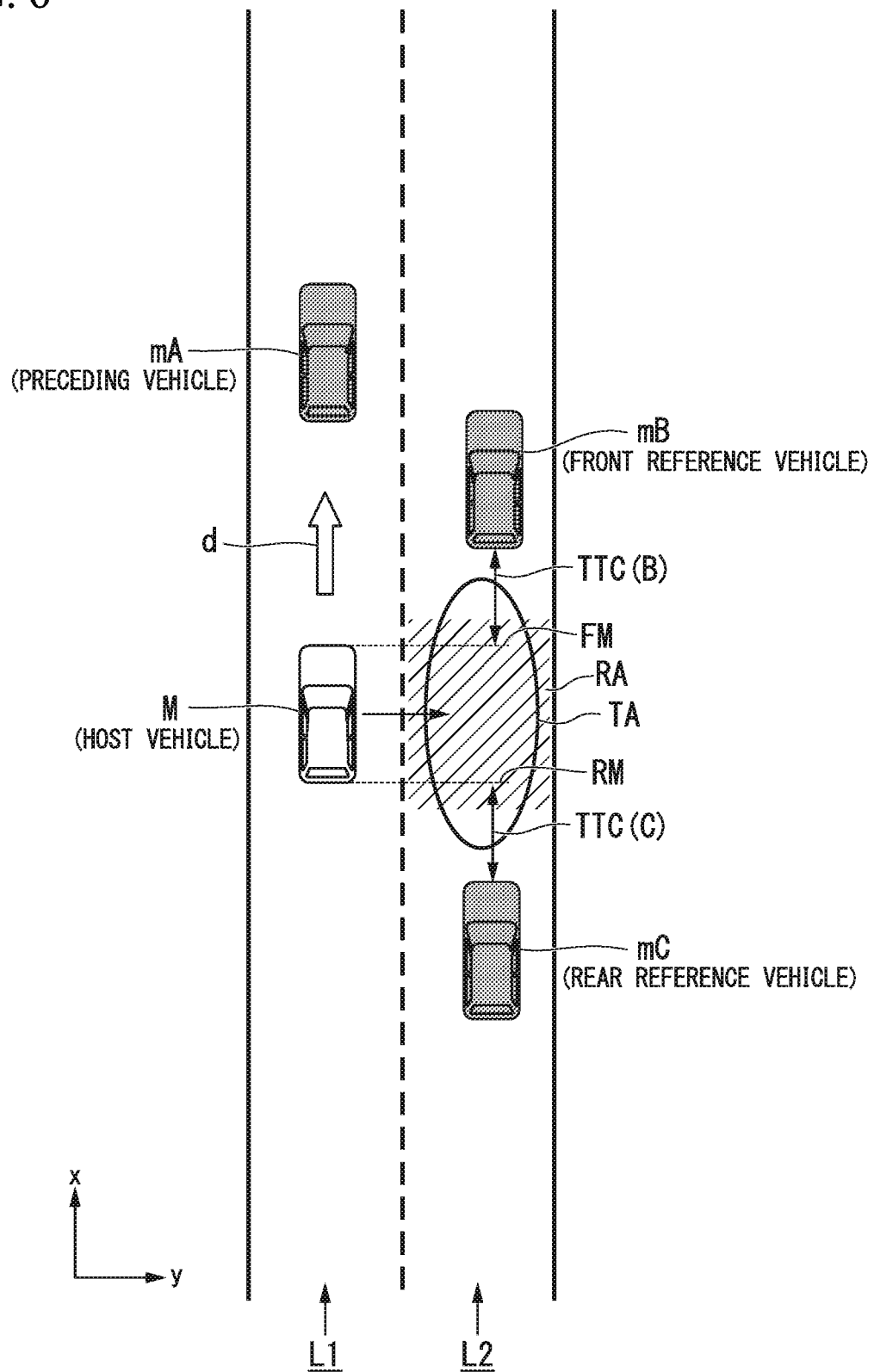
FIG. 6 is a diagram describing a method of setting a forbidden area referred to when determining the possibility of changing a lane.

The lane changeability determining unit 132 determines whether it is possible to change a traveling lane to the target position TA (that is, between the front reference vehicle mB and the rear reference vehicle mC) set by the target position setting unit 131. Hereinafter, an example of this method will be described with reference to FIG. 6. FIG. 6 is a diagram describing a method of setting a forbidden area RA referred to when determining lane changeability. The method illustrated in this drawing is an example when the target position TA is set to a position on a lateral side of the host vehicle M.

First, the lane changeability determining unit 132 projects the host vehicle M to a lane L2 of a lane change destination and sets a forbidden area RA with a small distance margin in a front-rear direction. As illustrated in FIG. 6, the forbidden area RA is set as an area extending from one end in a horizontal direction of the lane L2 to the other end. When a portion of a neighboring vehicle is present in the forbidden area RA, the lane changeability determining unit 132 determines that it is not possible to change a lane to the target position TA.

When the neighboring vehicle is not present in the forbidden area RA, the lane changeability determining unit 132 further determines whether it is possible to change a lane on the basis of a collision margin time TTC (time to collision) between the host vehicle M and the neighboring vehicle. The lane changeability determining unit 132 draws virtual lines from the front and rear ends of the host vehicle M toward the lane L2 of the lane change destination to create an extension line FM and an extension line RM, for example. The lane changeability determining unit 132 calculates a collision margin time TTC (B) between the extension line FM and the front reference vehicle mB and a collision margin time TTC (C) between the extension line RM and the rear reference vehicle mC. The collision margin time TTC (B) is a time derived by dividing the distance between the extension line FM and the front reference vehicle mB by a relative speed between the host vehicle M and the front reference vehicle mB. The collision margin time TTC (C) is a time derived by dividing the distance between the extension line RM and the rear reference vehicle mC and the relative speed between the host vehicle M and the rear reference vehicle mC. The lane changeability determining unit 132 determines that the host vehicle M can change its lane to the target position TA when the collision margin time TTC (B) is larger than a threshold Th (B) and the collision margin time TTC (C) is larger than a threshold Th (C).

The lane changeability determining unit 132 may determine whether the host vehicle M can change its lane to the target position TA by taking the speed, the acceleration, the derivative of the acceleration (jerk), and the like of the preceding vehicle mA, the front reference vehicle mB, and the rear reference vehicle mC into consideration. For example, when the speed of the front reference vehicle mB and the rear reference vehicle mC are greater than the speed of the preceding vehicle mA, and it is expected that the front reference vehicle mB and the rear reference vehicle mC will pass the preceding vehicle mA within a time period required for the host vehicle M to change its lane, the lane changeability determining unit 132 may determine that the host vehicle M cannot change its lane to the target position TA set between the front reference vehicle mB and the rear reference vehicle mC.

The second trajectory generating unit 133 generates a trajectory for allowing the host vehicle M to change the lane to the target position TA according to the determination result of the lane changeability determining unit 132. This trajectory is a set (a trajectory) of trajectory points obtained by sampling, at predetermined periods, the future target positions of the host vehicle M similarly to the trajectory generated by the first trajectory generating unit 122. The second trajectory generating unit 133 transmits trajectory data indicating the generated trajectory to the buffer ECU 150.

For example, the second trajectory generating unit 133 generates a trajectory for allowing the host vehicle M to change its lane to the target position TA when the lane changeability determining unit 132 determines that the host vehicle M can change its lane and does not generate a trajectory for allowing the host vehicle M to change its lane to the target position TA but generates a trajectory for maintaining the present lane when the lane changeability determining unit 132 determines that the host vehicle M cannot change its lane. The trajectory for maintaining the lane is a trajectory for allowing the host vehicle M to travel at the present speed, a trajectory for reducing the present speed, and a trajectory corresponding to the curvature of a road similarly to the trajectory generated by the first trajectory generating unit 122, for example.

Figure 7:
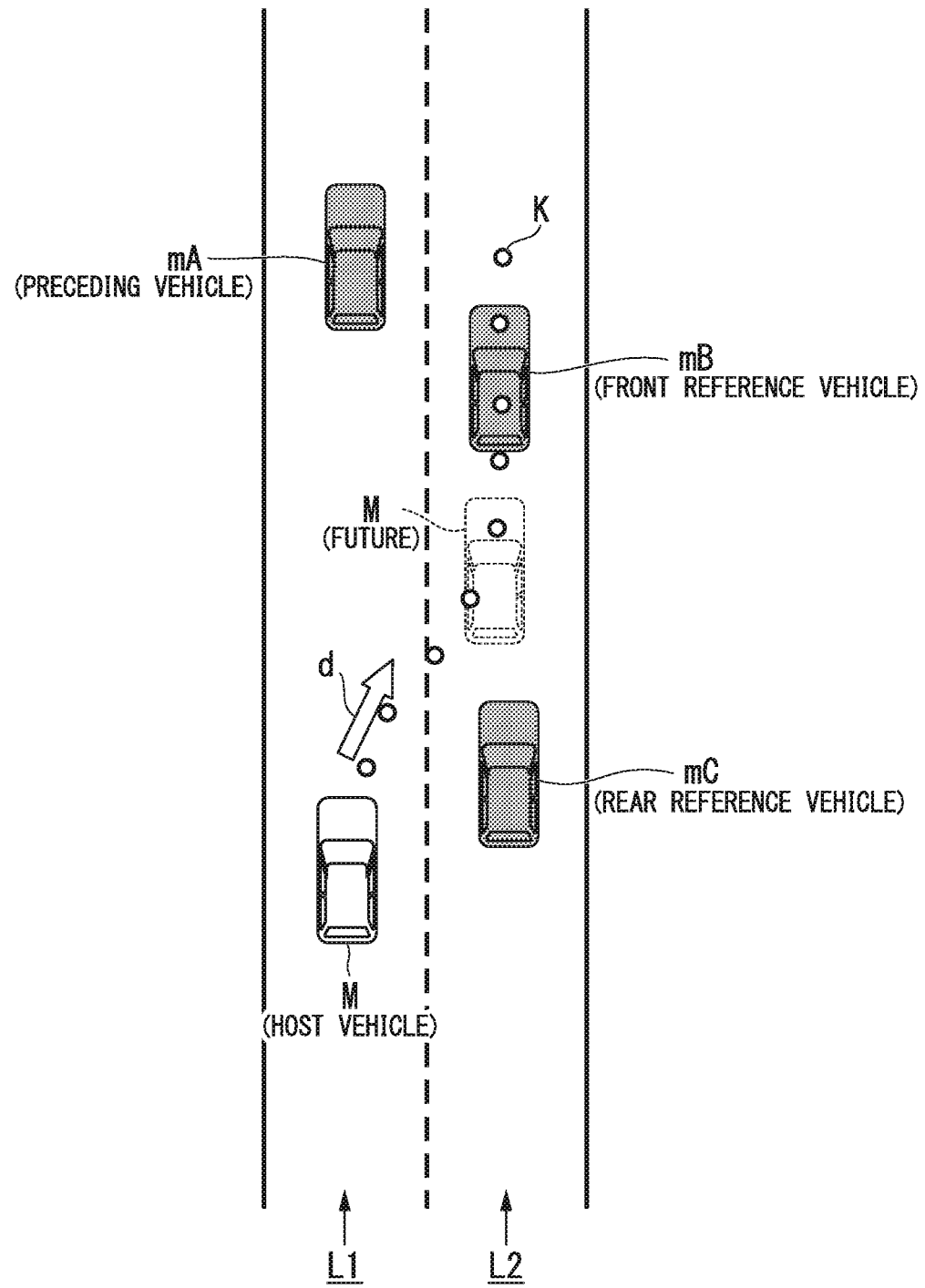
FIG. 7 is a diagram describing a method of generating trajectories by a second trajectory generating unit.

FIG. 7 is a diagram describing a method of generating a trajectory by the second trajectory generating unit 133. For example, the second trajectory generating unit 133 generates a trajectory, by assuming that the front traveling vehicle mA, the front reference vehicle mB and the rear reference vehicle mC travel according to predetermined speed models (speed models in which the speed recognized by the outside world recognition unit 114 is constant, for example), so that the host vehicle M is present between the front reference vehicle mB and the rear reference vehicle mC at a certain future time on the basis of the speed of the host vehicle M and the speed models of the three vehicles. For example, the second trajectory generating unit 133 connects the present position of the host vehicle M and the position of the front reference vehicle mB at a certain future time smoothly using a polynomial curve such as a spline curve and arranges a predetermined number of target positions K on this curve at equal or unequal intervals. In this case, the second trajectory generating unit 133 generates a trajectory so that at least one of the target positions K is disposed in the target position TA.

The trajectory data generated in this manner is output from the trajectory generation ECU 110 to the buffer ECU 150. The storage control unit 154 of the buffer ECU 150 writes the trajectory data output by the first trajectory generating unit 122 or the second trajectory generating unit 133 to a buffer area 158 of the storage unit 156. The buffer area 158 corresponds to some or all storage areas of a RAM, for example. The storage control unit 154 may have a primary buffer area in a RAM or a register so as to store data before writing the same in the buffer area 158.

[Distributed Processing of ECU]

Figure 8:
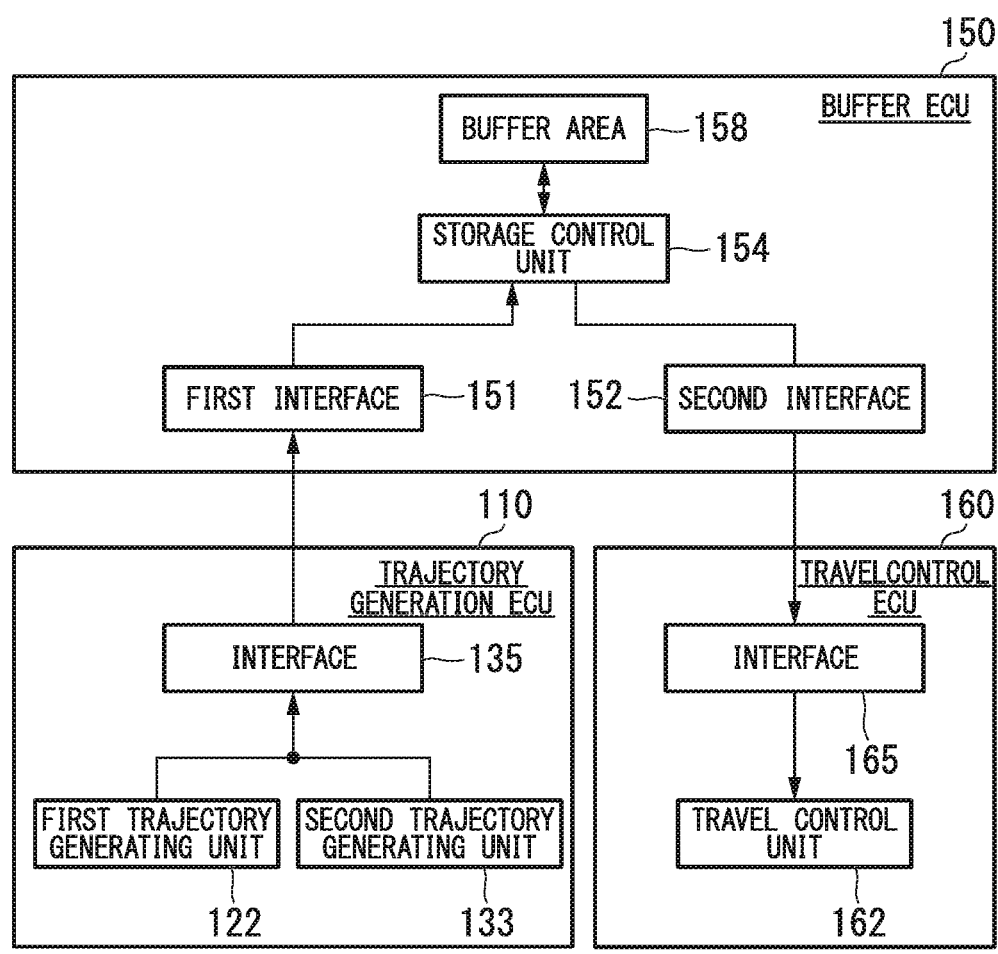
FIG. 8 is a diagram illustrating an example of a configuration of the vehicle control system according to the first embodiment.

FIG. 8 is a diagram illustrating a partial configuration of the vehicle control system 100 according to the first embodiment.

As illustrated in FIG. 8, the buffer ECU 150 may include a first interface 151 that communicates with the trajectory generation ECU 110 and a second interface 152 that communicates with the travel control ECU 160 in addition to the storage control unit 154. The first interface 151 and the second interface 152 may be realized by a hardware interface such as Ethernet (registered trademark), for example. The first interface 151 is connected to an interface 135 of the trajectory generation ECU 110 and the second interface 152 is connected to an interface 165 of the travel control ECU 160.

In this case, the storage control unit 154 receives the trajectory data from the trajectory generation ECU 110 via the first interface 151 and writes the trajectory data in the buffer area 158. The storage control unit 154 reads the trajectory data from the buffer area 158 at a predetermined transmission timing and transmits the trajectory data to the interface 165 of the travel control ECU 160 via the second interface 152. The predetermined transmission timing is the time after a predetermined period has elapsed from the reception time of the trajectory data, for example.

The storage control unit 154 detects that an abnormality has occurred in the trajectory data received via the first interface 151.

The "abnormality" indicates that information indicating that the trajectory data is abnormal is appended to a predetermined data area (for example, a starting metadata area) in the trajectory data, for example. The information indicating abnormality is appended by the first trajectory generating unit 122 or the second trajectory generating unit 133, for example. For example, when a voltage equal to or higher than a prescribed value is applied to a circuit board that forms the trajectory generation ECU 110, or a circuit is shorted or overheated whereby the trajectory generation ECU 110 performs an unexpected operation (for example, stops), the first trajectory generating unit 122 or the second trajectory generating unit 133 that is generating trajectories appends information indicating an abnormality to the trajectory data. A process of appending information indicating an abnormality may be replaced with a process of "not appending information indicating normal".

The "abnormality" may indicate that the trajectory data has a data format different from a predetermined data format.

The storage control unit 154 detects the above-described abnormalities by referring to the content of the trajectory data.

The "abnormality" may indicate that trajectory data has not been transmitted or that the number of trajectory points included in trajectory data is smaller than the number of trajectory points that are to be transmitted at one time. In such a case, the storage control unit 154 detects that an abnormality has occurred in the trajectory data when it is not possible to receive trajectory data including a predetermined number of trajectories until a predetermined period has elapsed from the time at which trajectory data was received previously.

The predetermined period may be changed according to the length of a trajectory included in trajectory data corresponding to one reception process (that is, the number of trajectory points). For example, the storage control unit 154 may decrease the predetermined period when a short trajectory is repeatedly generated in a short period by the trajectory generation ECU 110 and may increase the predetermined period when a long trajectory is repeatedly generated in a long period by the trajectory generation ECU 110.

When an abnormality occurs in the trajectory data, the storage control unit 154 stops a process of writing the trajectory data received via the first interface 151 in the buffer area 158. In this case, in a period in which the process of writing trajectory data in the buffer area 158 is stopped, the storage control unit 154 performs a process of reading trajectory data from the buffer area 158 and transmitting the same to the interface 165 of the travel control ECU 160. On the other hand, when an abnormality does not occur in the trajectory data, the storage control unit 154 continues to perform a process of reading trajectory data from the buffer area 158 and transmitting the same to the interface 165 of the travel control ECU 160.

When an abnormality occurs in the trajectory data, the storage control unit 154 may control the first interface 151 such that reception of trajectory data is mechanically stopped. For example, the storage control unit 154 may operate a switch (not illustrated) to block a communication path (a communication line) of trajectory data with respect to the storage control unit 154 to stop reception of trajectory data.

Upon detecting the occurrence of an abnormality in the trajectory data, the storage control unit 154 may transmit information indicating the occurrence of an abnormality in the trajectory data to the travel control ECU 160.

Figure 9:
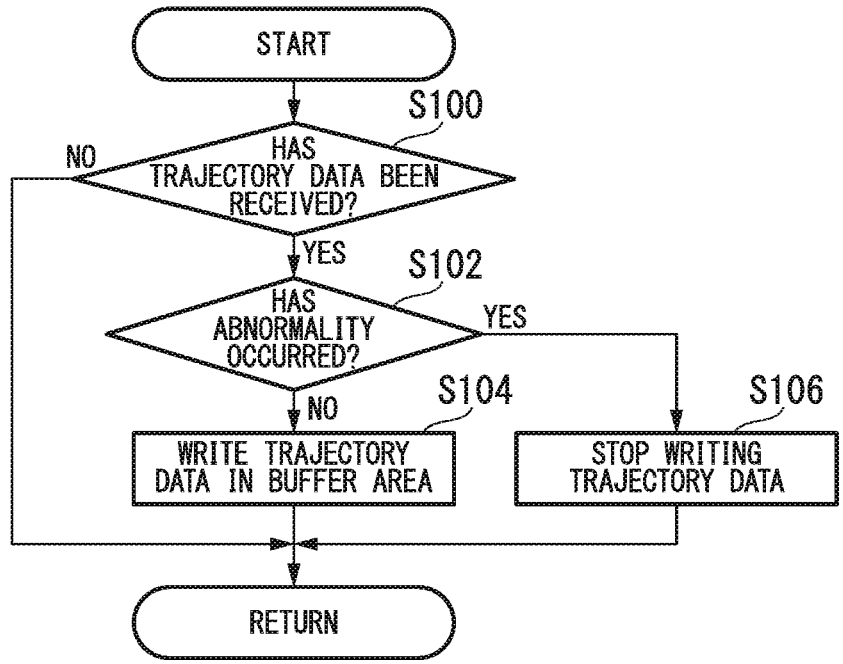
FIG. 9 is a flowchart illustrating an example of the flow of a writing process of a storage control unit according to the first embodiment.

FIG. 9 is a flowchart illustrating an example of the flow of a writing process of the storage control unit 154 according to the first embodiment. The process of this flowchart is repeatedly performed at predetermined periods, for example.

First, the storage control unit 154 waits until trajectory data is received from the trajectory generation ECU 110 (step S100) and determines whether an abnormality has occurred in the received trajectory data upon receiving the trajectory data (step S102). When an abnormality has not occurred in the received trajectory data, the storage control unit 154 writes the trajectory data in the buffer area 158 in correlation with the reception time of the trajectory data (step S104).

On the other hand, when an abnormality has occurred in the received trajectory data, the storage control unit 154 stops a process of writing trajectory data in the buffer area 158 (step S106). In this way, the process of this flowchart ends.

Figure 10:
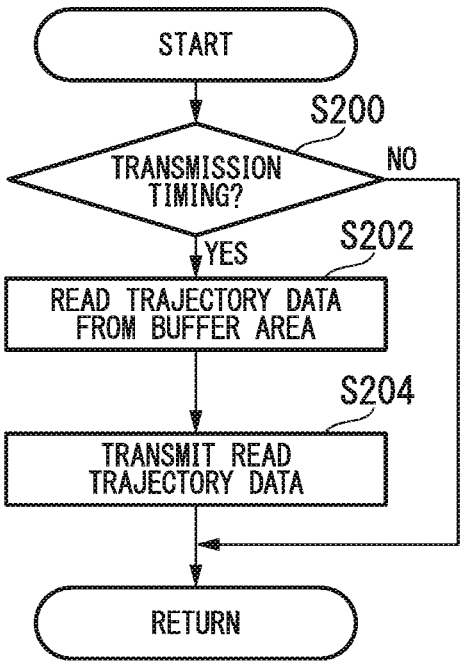
FIG. 10 is a flowchart illustrating an example of the flow of a reading process of the storage control unit according to the first embodiment.

FIG. 10 is a flowchart illustrating an example of the flow of a reading process of the storage control unit 154 according to the first embodiment. The process of this flowchart is repeatedly performed at predetermined periods, for example.

First, the storage control unit 154 determines whether a transmission timing has arrived (step S200). When the transmission timing has arrived, the storage control unit 154 reads the trajectory data from the buffer area 158 (step S202).

Subsequently, the storage control unit 154 transmits the trajectory data read from the buffer area 158 to the travel control ECU 160 (step S204). In this way, the process of this flowchart ends.

Figure 11:
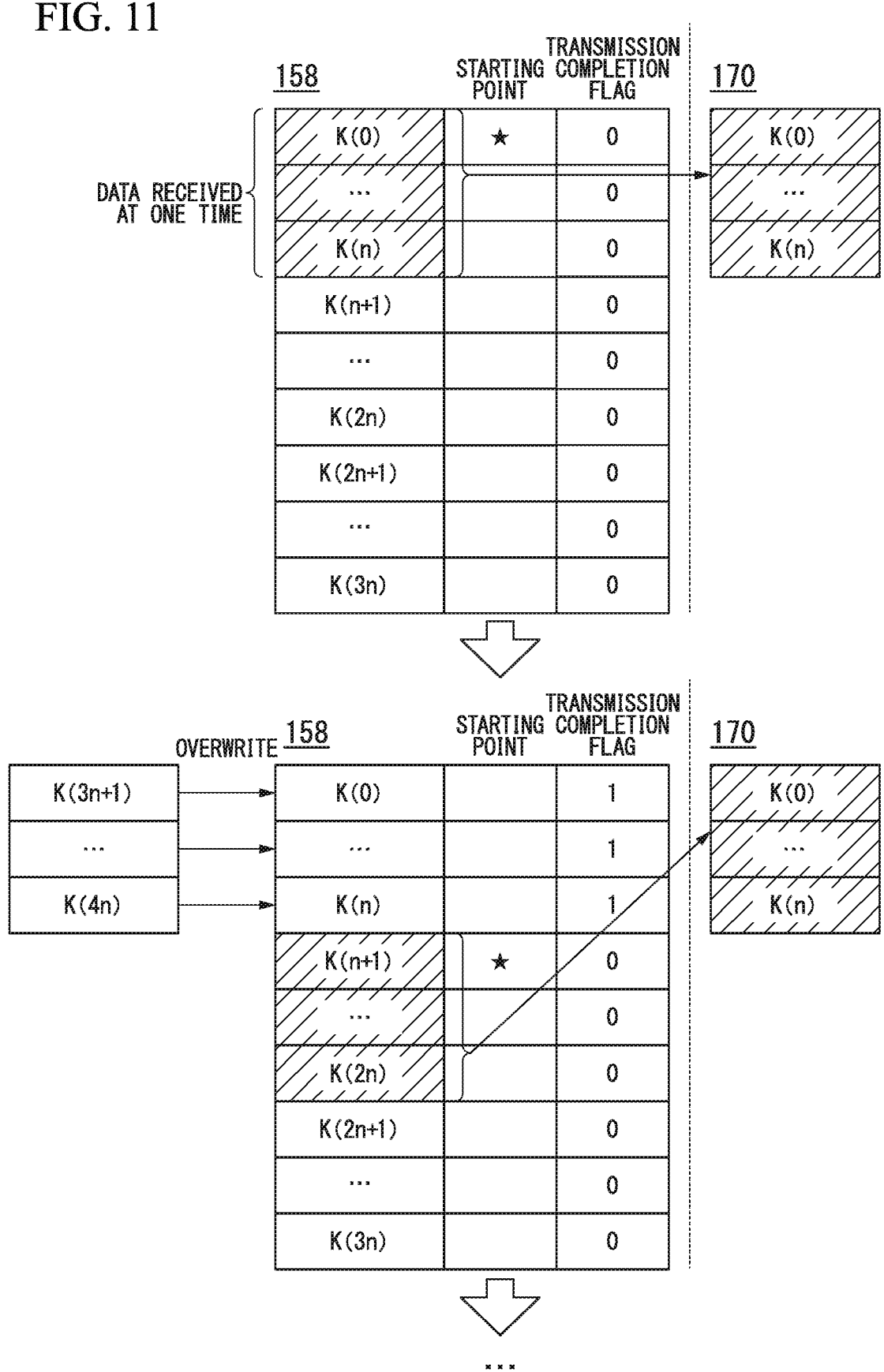
FIG. 11 is a diagram describing a process of reading trajectory data from a buffer area.

FIG. 11 is a diagram describing a process of reading trajectory data from the buffer area 158. For example, the storage control unit 154 receives trajectory data including n trajectory points from the trajectory generation ECU 110 in one reception process. In this case, the buffer area 158 is set as an area capable of storing trajectory data corresponding to a plurality of (three in FIG. 11) reception processes, for example. A "starting point" is assigned to the oldest trajectory data among the plurality of pieces of trajectory data stored in the buffer area 158 in order to identify the trajectory data. In the example of FIG. 11, the starting point is assigned to a trajectory point K(0) having the smallest number (the future target position is the closest to the present position of the host vehicle M) among the plurality of pieces of trajectory data including trajectory points K(0) to K(n).

The storage control unit 154 reads data of a predetermined number of trajectory points sequentially starting from the trajectory point to which the starting point is assigned. That is, the storage control unit 154 reads the data of a predetermined number (n in FIG. 11) of trajectory points from the buffer area 158. The storage control unit 154 transmits a set of the read data of the predetermined number of trajectory points to the travel control ECU 160 at one time as trajectory data. The storage control unit 154 may read trajectory data including n trajectory points or smaller and transmit the trajectory data to the travel control ECU 160.

After that, the storage control unit 154 changes a starting point to the oldest trajectory data among a plurality of pieces of trajectory data excluding the transmitted trajectory data in the buffer area 158. In the example of FIG. 11, the storage control unit 154 changes the starting point to a trajectory point K(n+1) of trajectory data including trajectory points K(n+1) to K(2n). Therefore, the storage control unit 154 reads the data of a plurality of number of trajectory points sequentially starting from the trajectory point K(n+1) to which the starting point is assigned and transmits the trajectory data including the trajectory points K(n+1) to K(2n) to the travel control ECU 160.

When transmission of trajectory data is completed, the storage control unit 154 assigns a flag (hereinafter referred to as a transmission completion flag) indicating completion of transmission to an area (the address of the area) in which the trajectory data was stored. In the example of FIG. 11, the storage control unit 154 assigns a transmission completion flag of "1" to an area in which the trajectory points K(0) to K(n) are stored since trajectory data including the trajectory points K(0) to K(n) has been transmitted. "0" is set to an area to which the transmission completion flag is not assigned.

The storage control unit 154 overwrites newly received trajectory data in an area in which trajectory data which has been transmitted is stored. That is, the storage control unit 154 overwrites newly received trajectory data in an area to which the transmission completion flag has been assigned among a plurality of areas of the buffer area 158.

[Travel Control]

The travel control unit 162 of the travel control ECU 160 sets the control mode to an automatic driving mode or a manual driving mode by the control of the control switching unit 164 and controls a control target including some or all of the travel drive force output device 90, the steering device 92, and the brake device 94 according to the set control mode. The travel control unit 162 reads the action plan information 146 generated by the action plan generation unit 116 in the automatic driving mode and controls a control target on the basis of the events included in the read action plan information 146.

For example, the travel control unit 162 determines a control amount (for example, revolutions per minute) of the electric motor of the steering device 92 and a control amount (for example, an engine throttle opening or a shift step) of the ECU of the travel drive force output device 90 on the basis of the trajectory data transmitted by the buffer ECU 150. Moreover, the travel control unit 162 determines a control amount of the electric motor of the steering device 92 according to an angle between a traveling direction of the host vehicle M for each target position K indicated by the trajectory data and the direction of the next target position with respect to the target position.

Figure 12:
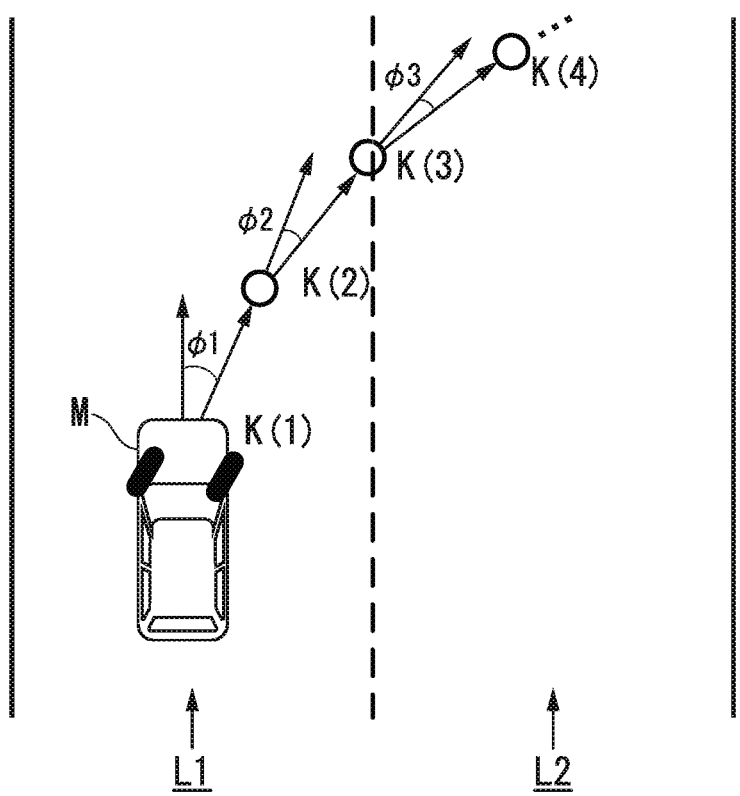
FIG. 12 is a diagram illustrating an example of a situation of determining a control amount of a steering device by a travel control unit.

FIG. 12 is a diagram illustrating an example of a situation of determining a control amount of the steering device 92 by the travel control unit 162. The target position K(i) on the trajectory generated by the first trajectory generating unit 122 or the second trajectory generating unit 133 includes a component of a turning angle 4$i$ for allowing the host vehicle M to travel in the direction in which a target position K(i+1), at which the host vehicle M is scheduled to arrive subsequently to the target position K(i), is present. The turning angle 4$i$ is an angle between an axle direction of the host vehicle M at the target position K(i) and the presence direction of the next arrival target position K(i+1) when the target position K(i) is used as a reference position, for example.

The steering angle for realizing the turning angle 4$i$ is determined on the basis of a wheelbase length of the host vehicle M, a tread interval, and a vehicle behavior including a speed in addition to the turning angle 4$i$. For example, the travel control unit 162 determines a steering angle on the basis of the turning angle 4$i$ corresponding to each target position K(i), a vehicle speed (or an acceleration or a jerk) acquired from the vehicle sensor 60, and an angular speed (a yaw rate) around a vertical axis and determines a control amount of the electric motor of the steering device 92 so that a displacement corresponding to the steering angle is applied to wheels.

In the example of FIG. 12, the host vehicle M is positioned at the target position K(1) and travels on the trajectory generated to change its lane. In such a case, the travel control unit 162 determines a control amount of the electric motor of the steering device 92 so that wheels are directed to the right side in FIG. 12, for example, on the basis of the turning angle $\phi 1$ which is an angle between the traveling direction of the host vehicle M at the target position K(1) and the direction of the next arrival target position K(2). The travel control unit 162 repeatedly performs the above-described process for the target positions K(2), K(3), . . . to allow the host vehicle M to change its lane.

The travel control unit 162 outputs information indicating the control amount to the corresponding control target. In this way, the respective control target devices (90, 92, 94) can control the host devices according to the information indicating the control amount input from the travel control unit 162. Moreover, the travel control unit 162 appropriately adjusts the determined control amount on the basis of the detection result of the vehicle sensor 60.

The travel control unit 162 controls a control target on the basis of operation detection signals output by the operation detection sensor 72 in a manual driving mode. For example, the travel control unit 162 outputs the operation detection signals output by the operation detection sensor 72 to the respective control target devices as they are.

When an abnormality in the trajectory data is detected by the storage control unit 154 in the automatic driving mode (that is, information indicating the occurrence of an abnormality in the trajectory data is notified from the buffer ECU 150 (the storage control unit 154)), the travel control unit 162 outputs information for forcibly switching the automatic driving mode to the manual driving mode using a speaker mounted in the host vehicle M, a display device such as a liquid crystal display, the navigation device 50, and the like to prompt the driver to start manual driving.

In a state in which information for forcibly switching the automatic driving mode to the manual driving mode is output, when an operation amount included in the operation detection signal does not exceed a threshold for a predetermined period (that is, the operation devices 70 have not been operated by the driver for a predetermined period), the travel control unit 162 may determine the control amount of the control target devices (90, 92, 94) so as to decelerate and stop the host vehicle M.

The control switching unit 164 switches the control mode of the host vehicle M by the travel control unit 162 from the automatic driving mode to the manual driving mode or from the manual driving mode to the automatic driving mode on the basis of the action plan information 146 that is generated by the action plan generation unit 116 and stored in the storage unit 140. Moreover, the control switching unit 164 switches the control mode of the host vehicle M by the travel control unit 162 from the automatic driving mode to the manual driving mode or from the manual driving mode to the automatic driving mode on the basis of the control mode designation signal input from the changeover switch 80. That is, the control mode of the travel control unit 162 can be changed arbitrarily by an operation of the driver during traveling or when stopped.

The control switching unit 164 switches the control mode of the host vehicle M by the travel control unit 162 from the automatic driving mode to the manual driving mode on the basis of the operation detection signal input from the operation detection sensor 72. For example, the control switching unit 164 switches the control mode of the travel control unit 162 from the automatic driving mode to the manual driving mode when an operation amount included in the operation detection signal exceeds a threshold (that is, the operation device 70 is operated using an operation amount exceeding a threshold). For example, when the host vehicle M travels in the automatic driving mode due to the travel control unit 162 being set to the automatic driving mode, and the steering wheel, the acceleration pedal, or the brake pedal is operated by the driver with an operation amount exceeding a threshold, the control switching unit 164 switches the control mode of the travel control unit 162 from the automatic driving mode to the manual driving mode. In this way, the vehicle control system 100 can switch to the manual driving mode immediately and not via the operation of the changeover switch 80 according to a prompt operation of the driver when an object such as a person rushes into a driveway and a preceding vehicle stops abruptly. As a result, the vehicle control system 100 can cope with an operation during emergency using the driver and enhance safety during traveling.

The control switching unit 164 switches the control mode of the host vehicle M by the travel control unit 162 from the automatic driving mode to the manual driving mode when the process of the storage control unit 154 writing trajectory data to the buffer area 158 is stopped in the automatic driving mode. In this case, the control switching unit 164 may secure a period (hereinafter referred to as a driving operation transfer grace period) required for driving preparation to adjust the position of a car seat rather than switching to the manual driving mode immediately. The driving operation transfer grace period corresponds to a period from a timing at which an abnormality in the trajectory data is detected to a timing at which a period (target time T) corresponding to the length of a trajectory has elapsed. The control switching unit 164 may switch the control mode from the automatic driving mode to the manual driving mode earlier than the timing at which the period corresponding to the length of a trajectory has elapsed. That is, the control switching unit 164 may switch the control mode from the automatic driving mode to the manual driving mode without waiting for the timing at which the driving operation transfer grace period has elapsed completely.

Figure 13:
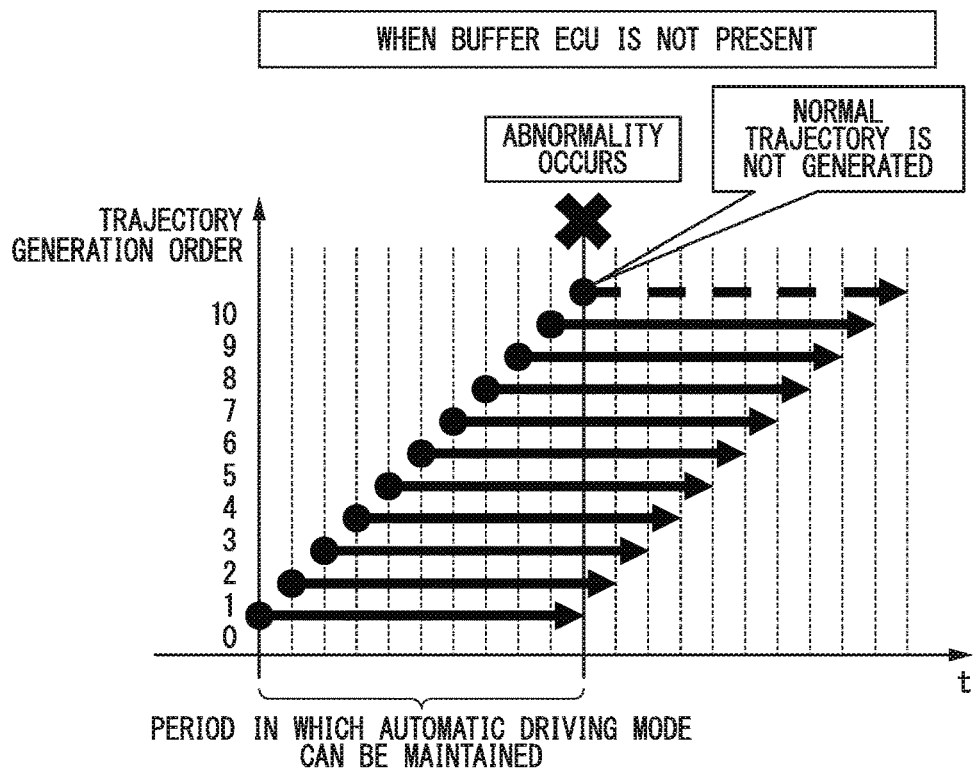
FIG. 13 is a diagram describing an operation of a travel control ECU in a comparative example (that is, a vehicle control system in which a buffer ECU is not present).
Figure 14:
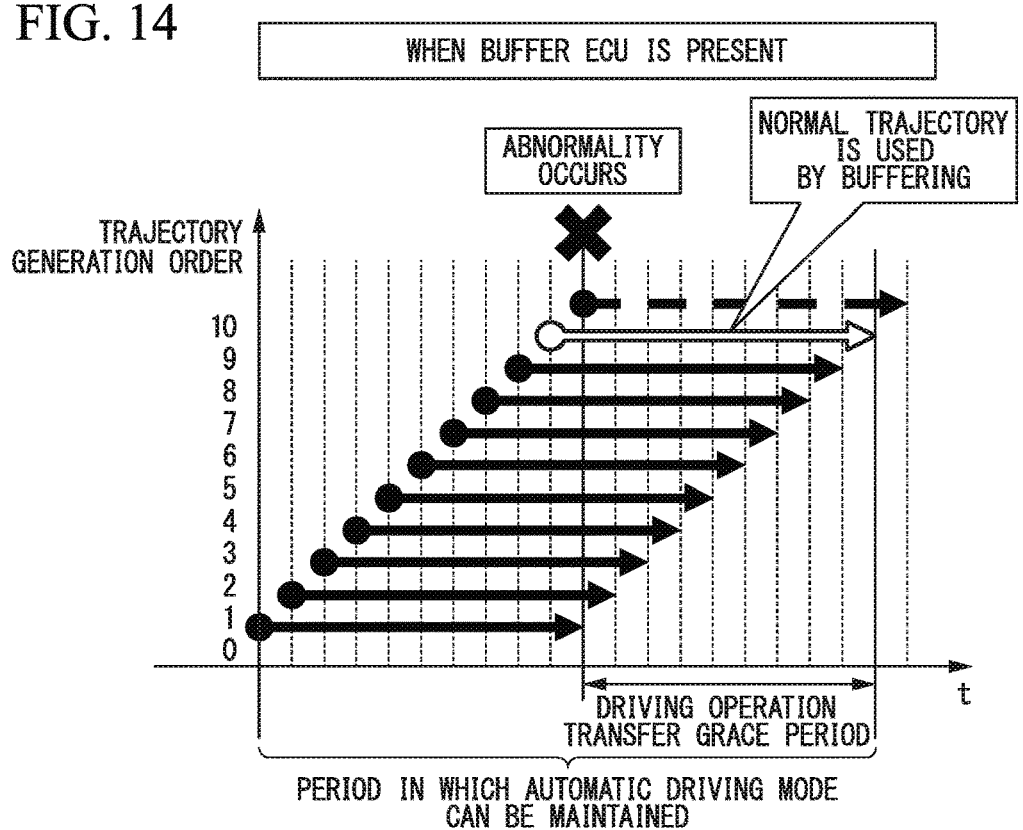
FIG. 14 is a diagram describing an operation of a travel control ECU when a buffer ECU according to the first embodiment is present.

FIG. 13 is a diagram describing an operation of the travel control ECU 160 in a comparative example (that is, a vehicle control system in which the buffer ECU 150 is not present). This comparative example is a configuration in which the buffer ECU 150 is not present (that is, a configuration in which the functions corresponding to the trajectory generation ECU 110 and the travel control ECU 160 are realized by one ECU) or a configuration in which the output of the trajectory generation ECU 110 is output to the travel control ECU 160 directly without via the buffer ECU 150. FIG. 14 is a diagram describing an operation of the travel control ECU 160 when the buffer ECU 150 according to the first embodiment is present.

As illustrated in FIG. 13, in the comparative example, when an "abnormality" such as information indicating an abnormality being appended to trajectory data occurs, the travel control ECU 160 needs to switch the control mode to the manual driving mode at the timing at which an abnormality occurred since it is not possible to perform the automatic driving mode on the basis of the trajectory data which is determined to be abnormal. Moreover, it is assumed that since switching to the manual driving mode immediately is a large burden to the driver, control of stopping the host vehicle automatically may be performed.

On the other hand, as illustrated in FIG. 14, in the case of a configuration in which the buffer ECU 150 is included like the present embodiment, the trajectory data generated by the trajectory generation ECU 110 is stored in the buffer ECU 150 at one time and is then transmitted to the travel control ECU 160. In this case, when the occurrence of an abnormality in the trajectory data is detected, the buffer ECU 150 stops the process of writing the subsequent trajectory data in the buffer area 158. Therefore, only trajectory data generated before an abnormality occurs is stored in the buffer area 158. Since the trajectory data generated before an abnormality occurs is output from the buffer ECU 150 to the travel control ECU 160 with a time difference from the reception timing at which the trajectory data was received from the trajectory generation ECU 110, the travel control ECU 160 can continue automatic driving for a certain period (the driving operation transfer grace period) from the timing at which an abnormality occurred. Moreover, since the travel control ECU 160 can determine the control amount of each control target using only the trajectory data generated before an abnormality occurs, it is possible to prevent the travel control ECU 160 from performing abnormal control.

The travel control unit 162 notifies the driver of the fact that the control mode is forcibly switched to the manual driving mode in the driving operation transfer grace period, whereby the vehicle control system 100 can gain time until the driver starts manual driving. In this way, the vehicle control system 100 can realize transition of the driving mode more safely. Moreover, even when the host vehicle is controlled such that it stops rather than switching to the manual driving mode, the vehicle control system 100 can perform control such as gradually decelerating in the grace period rather than immediately stopping the host vehicle. In any case, the vehicle control system 100 can terminate the automatic driving mode more smoothly.

According to the vehicle control system 100 according to the first embodiment described above, the buffer ECU 150 stores the trajectory data received from the trajectory generation ECU 110 in the buffer area 158, and when an abnormality occurs in the trajectory data received from the trajectory generation ECU 110, the travel control ECU 160 automatically controls at least one of acceleration/deceleration and steering of the host vehicle M on the basis of the trajectory data written in the buffer area 158 before the abnormality occurred. In this way, it is possible to terminate the automatic driving mode more smoothly.

According to the vehicle control system 100 according to the first embodiment described above, when the trajectory generation ECU 110 which needs to have an advanced function of generating a trajectory according to the state of neighboring vehicles and the state of the host vehicle is designed to have a low fault rate and high safety, the cost is likely to increase. Since the buffer ECU 150 that performs only processes of reading and writing trajectory data and detecting abnormalities and does not need to have an advanced function unlike the trajectory generation ECU 110, even when the buffer ECU 150 is designed to have a low fault rate and high safety, the cost can be reduced. Due to this, since the vehicle control system 100 according to the first embodiment includes the buffer ECU 150, it is possible to suppress the cost of the trajectory generation ECU 110 while maintaining a low fault rate and guaranteeing a certain level of safety or higher.

According to the vehicle control system 100 according to the first embodiment, since the storage capacity of the RAM included in the storage unit 156 of the buffer ECU 150 is smaller than the storage capacity of the RAM included in the storage unit 140 of the trajectory generation ECU 110, it is possible to realize the storage unit 156 using an expensive RAM having high safety, for example, and to improve the cost effectiveness.

According to the vehicle control system 100 according to the first embodiment described above, when the buffer ECU 150 detects that an abnormality has occurred in the trajectory data received from the trajectory generation ECU 110, since the buffer ECU 150 stops storing the trajectory data in the buffer area 158, the travel control ECU 160 does not automatically control at least one of acceleration/deceleration and steering of the host vehicle on the basis of the trajectory data generated after the abnormality occurred. As a result, the vehicle control system 100 can improve safety during traveling.

According to the vehicle control system 100 according to the first embodiment described above, when the buffer ECU 150 detects that an abnormality has occurred in the trajectory data received from the trajectory generation ECU 110, since the buffer ECU 150 stops receiving the trajectory data generated by the trajectory generation ECU 110, the travel control ECU 160 does not automatically control at least one of acceleration/deceleration and steering of the host vehicle on the basis of the trajectory data generated after the abnormality occurred. As a result, the vehicle control system 100 can improve safety during traveling.

First Modification of First Embodiment

Figure 15:
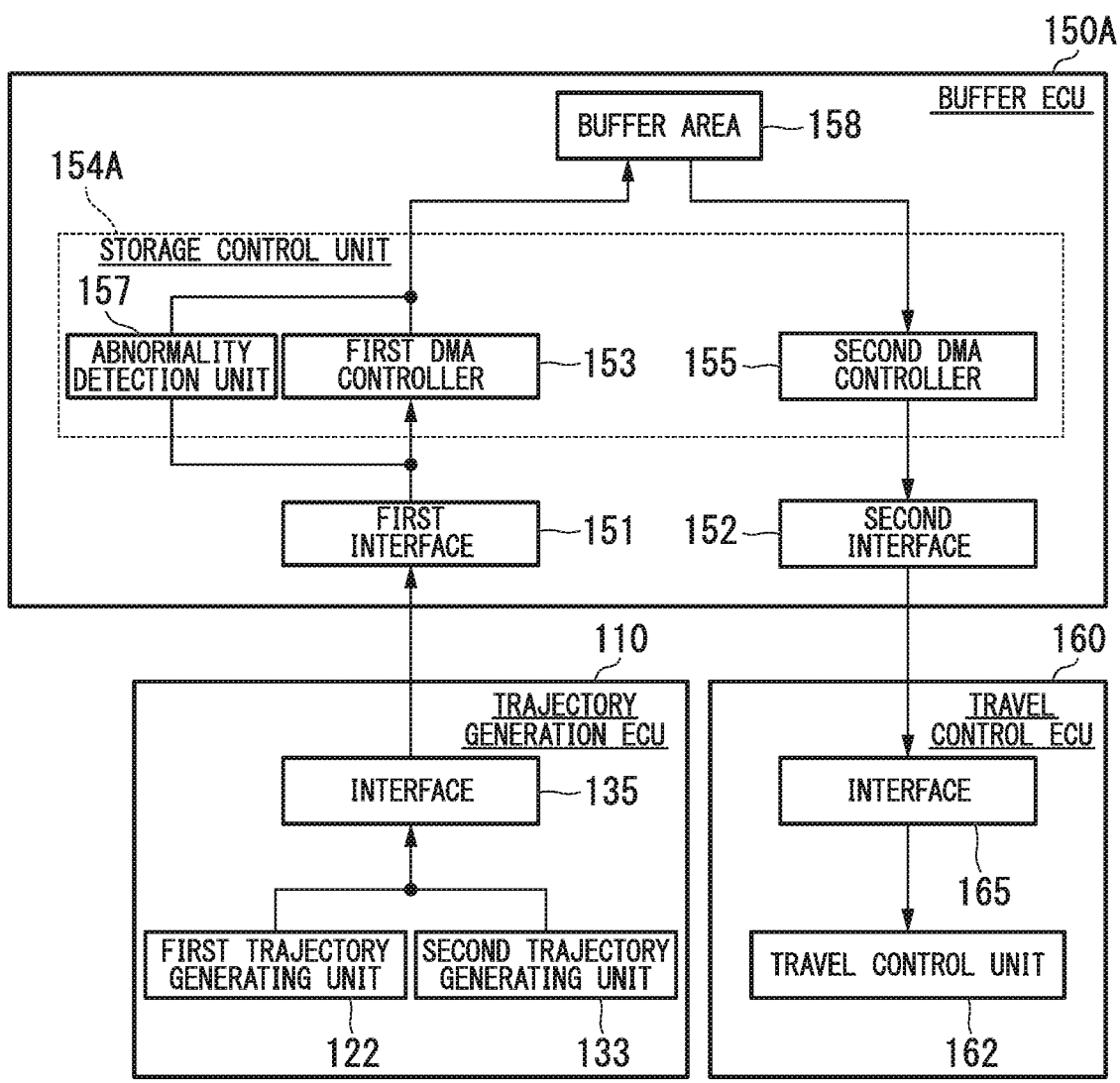
FIG. 15 is a diagram illustrating an example of a configuration of a buffer ECU according to a modification of the first embodiment.

Hereinafter, a first modification of the vehicle control system 100 according to the first embodiment will be described. FIG. 15 is a diagram illustrating an example of a configuration of a buffer ECU 150A according to a modification of the first embodiment. A storage control unit 154A of the buffer ECU 150A according to the modification of the first embodiment includes a first DMA controller 153, a second DMA controller 155, and an abnormality detection unit 157, for example.

The first DMA controller 153 and the second DMA controller 155 may be realized by hardware such as an LSI or an ASIC, for example. Moreover, the abnormality detection unit 157 may be realized when a processor such as a CPU executes a program and may be realized by hardware such as an LSI or an ASIC.

The first DMA controller 153 writes the trajectory data received from the trajectory generation ECU 110 in the buffer area 158 using DMA transmission via the first interface 151. Moreover, the first DMA controller 153 stops the writing process with respect to the buffer area 158 when the abnormality detection unit 157 to be described later detects an abnormality.

The second DMA controller 155 reads trajectory data from the buffer area 158 using DMA transmission. The second DMA controller 155 transmits the read trajectory data to the travel control ECU 160 via the first interface 151.

The abnormality detection unit 157 monitors the trajectory data output to the first DMA controller 153 via the first interface 151 to detect an abnormality. Upon detecting an abnormality, the abnormality detection unit 157 stops the writing process of the first DMA controller 153. In this way, when an abnormality occurs in the trajectory data, since the buffer ECU 150A performs a process of reading trajectory data from the buffer area 158 only, the travel control ECU 160 can control the control target using only the normal trajectory data stored in the buffer area 158 without controlling the control target using abnormal trajectory data.

Second Modification of First Embodiment

Hereinafter, a second modification of the vehicle control system 100 according to the first embodiment will be described. In the second modification, the storage control unit 154 sequentially reads trajectory data, for which a predetermined period has elapsed from the time at which the trajectory data was received, from the buffer area 158 and transmits the trajectory data to the interface 165 of the travel control ECU 160 via the second interface 152 in the order that the trajectory data was read.

Figures 16, 17:
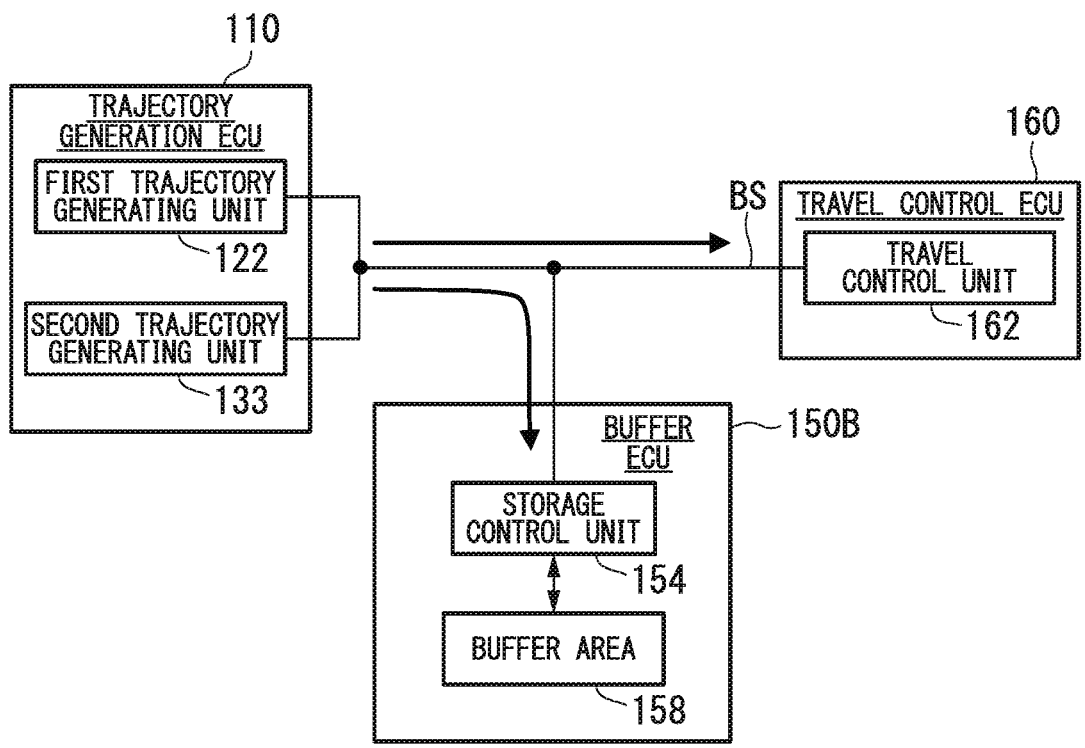
FIG. 16 is a diagram describing a process of transmitting trajectory data sequentially according to a reception time.
FIG. 17 is a diagram illustrating an example of a configuration of a vehicle control system according to a second embodiment.

FIG. 16 is a diagram describing a process of transmitting trajectory data sequentially according to the reception time. As illustrated in FIG. 16, "reception time" and "transmission completion flag" are stored in the buffer area 158 in correlation with each "trajectory data". The "transmission completion flag" is set to "1" for trajectory data for which a predetermined period has elapsed from the reception time and is set to "0" for trajectory data for which a predetermined period has not elapsed from the reception time. The storage control unit 154 reads the trajectory data, for which a predetermined period has elapsed, sequentially from the buffer area 158 by referring to the reception time and transmits the read trajectory data to the travel control ECU 160. The storage control unit 154 rewrites the "transmission completion flag" from "0" to "1" when a predetermined period has elapsed and the trajectory data was read. When performing a writing process, the storage control unit 154 may overwrite new trajectory data in an area in which the "transmission completion flag" is set to "1". In this case, the storage control unit 154 rewrites the "transmission completion flag" being set to "1" to "0".

Second Embodiment

Hereinafter, a second embodiment will be described. The vehicle control system 100 according to the second embodiment is different from that of the first embodiment in that the trajectory generation ECU 110, a buffer ECU 150B, and the travel control ECU 160 are connected together via one or more communication lines (buses) BS via which information being transmitted can be referred to by a plurality of devices. Hereinafter, the difference will be mainly described. The communication line BS may be a serial communication line or a parallel communication line, for example.

FIG. 17 is a diagram illustrating an example of a configuration of the vehicle control system 100 according to the second embodiment. As illustrated in FIG. 17, each trajectory generating unit of the trajectory generation ECU 110 outputs trajectory data to the communication line BS.

The storage control unit 154 of the buffer ECU 150B acquires (receives) the trajectory data output to the communication line BS and writes the acquired trajectory data in the buffer area 158. Moreover, the storage control unit 154 determines whether an abnormality has occurred in the acquired trajectory data, and reads trajectory data written to the buffer area 158 when an abnormality has occurred. The storage control unit 154 outputs the read trajectory data to the communication line BS. In this case, the storage control unit 154 outputs the trajectory data to the communication line BS while assigning information indicating that the trajectory data is normal to the read trajectory data.

The travel control unit 162 of the travel control ECU 160 acquires the trajectory data output to the communication line BS, determines a control amount of each control target on the basis of the acquired trajectory data, and controls the control target.

When a plurality of pieces of trajectory data having the same identifiers is transmitted to the communication line BS, for example, the travel control unit 162 selects trajectory data to which information indicating high priority is assigned by the buffer ECU 150B. In this case, when the trajectory data output by the trajectory generation ECU 110 and the trajectory data output by the buffer ECU 150B are transmitted to the communication line BS, the travel control unit 162 determines a control amount of each control target using the trajectory data which is output by the buffer ECU 150B more preferentially.

When a plurality of pieces of trajectory data having the same identifiers is transmitted to the communication line BS, the travel control unit 162 may select trajectory data to which information indicating that the trajectory data is normal is assigned by the buffer ECU 150B.

When a plurality of ECUs outputs trajectory data to the communication line BS, these ECUs may perform a communication process such as adjustment of a CAN with respect to the communication line BS so that trajectory data is output from any one of the ECUs.

According to the vehicle control system 100 according to the second embodiment described above, it is possible to terminate the automatic driving mode more smoothly similarly to the first embodiment described above.

Third Embodiment

Hereinafter, a third embodiment will be described. The vehicle control system 100 according to the third embodiment is different from those of the first and second embodiments in that a buffer ECU 150C predicts a trajectory including a future target position later than a future target position at which the host vehicle M is expected to arrive on the basis of the trajectory data written in the buffer area 158. Hereinafter, this difference will be mainly described.

Figure 18:
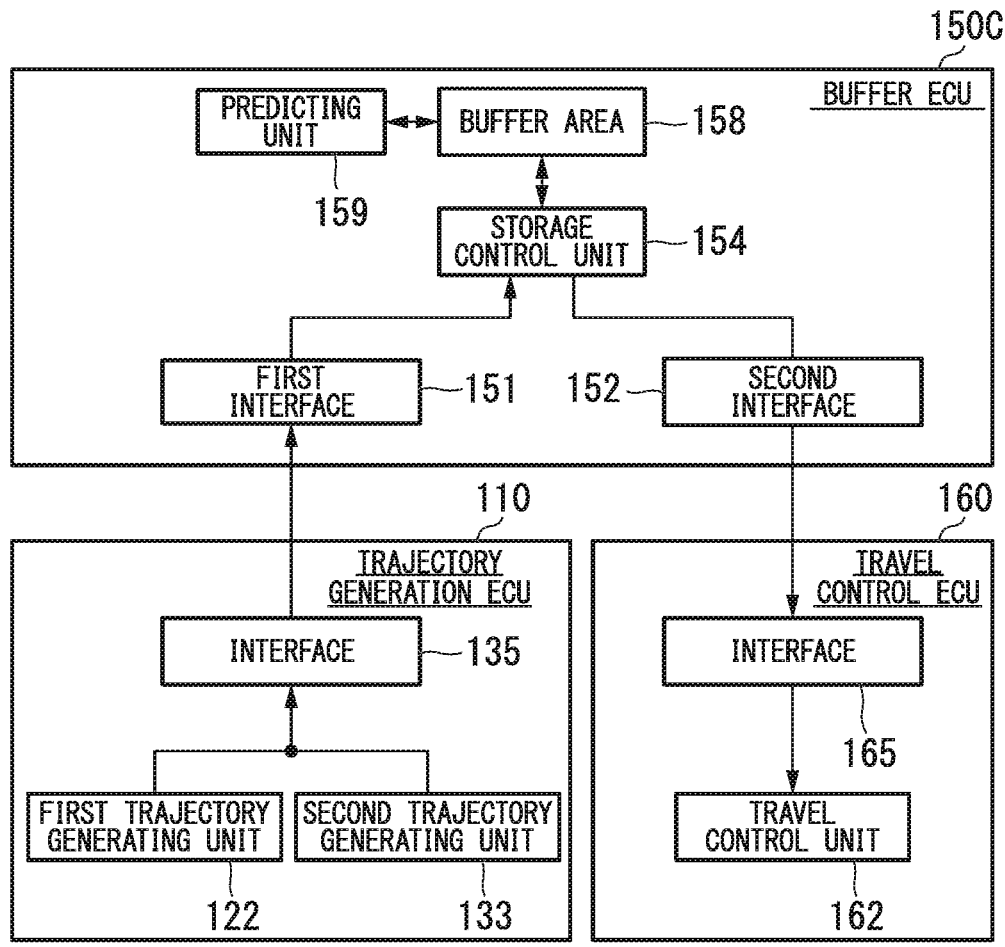
FIG. 18 is a diagram illustrating an example of a configuration of a vehicle control system according to a third embodiment.

FIG. 18 is a diagram illustrating an example of a configuration of a vehicle control system 100 according to a third embodiment. As illustrated in FIG. 18, the buffer ECU 150C according to the third embodiment further includes a predicting unit 159 in addition to the first interface 151, the second interface 152, the storage control unit 154, and the buffer area 158 of the storage unit 156 described above. The buffer area 158 according to the third embodiment further includes an area in which a future trajectory predicted by the predicting unit 159 is stored unlike the above-described embodiments.

The predicting unit 159 predicts a trajectory including future target positions later than the future target positions indicated by the trajectory on the basis of the trajectory data received via the first interface 151. For example, the predicting unit 159 generates additional trajectory data obtained by extending the trajectory indicated by the trajectory data in the traveling direction of the host vehicle M using a clothoid curve, a spline curve, or the like.

Figure 19:
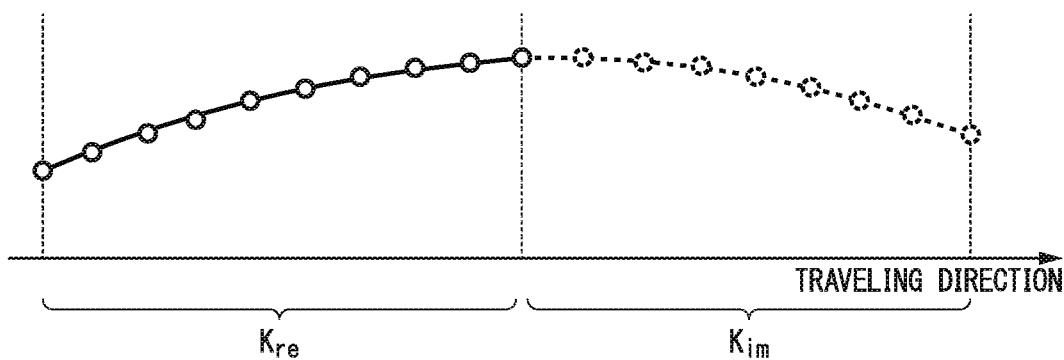
FIG. 19 is a diagram illustrating how additional trajectory data is generated.

FIG. 19 is a diagram illustrating how additional trajectory data is generated. In FIG. 19, $K_{re}$ indicates future target positions (trajectory points) indicated by trajectory data and $K_{im}$ indicates yet later future target positions. For example, the predicting unit 159 derives a function of fitting the target positions to a curve (or a straight line) indicating the track of the trajectory and extends the trajectory toward the traveling direction of the host vehicle M using the function. The extended trajectory is replaced with a predetermined number of trajectory points (target positions). The storage control unit 154 adds additional trajectory data in which the trajectory is extended by the predicting unit 159 to the original trajectory data to obtain data and writes the obtained data to the buffer area 158. In this way, the travel control ECU 160 can control a control target on the basis of the extended trajectory. As a result, when an abnormality occurs in the trajectory data, the vehicle control system 100 according to the third embodiment can maintain the automatic driving mode for a longer period and gain time until the driver starts a manual driving mode.

The vehicle control system 100 according to the third embodiment can terminate the automatic driving mode more smoothly similarly to the first and second embodiments described above.

Fourth Embodiment

Hereinafter, a fourth embodiment will be described. A vehicle control system 100 according to the fourth embodiment is different from those of the first to third embodiments in that a travel control ECU 160D stores trajectory data and detects an abnormality in the trajectory data (that is, the function of the buffer ECU 150 is included in the travel control ECU 160D). Hereinafter, these differences will be mainly described.

Figure 20:
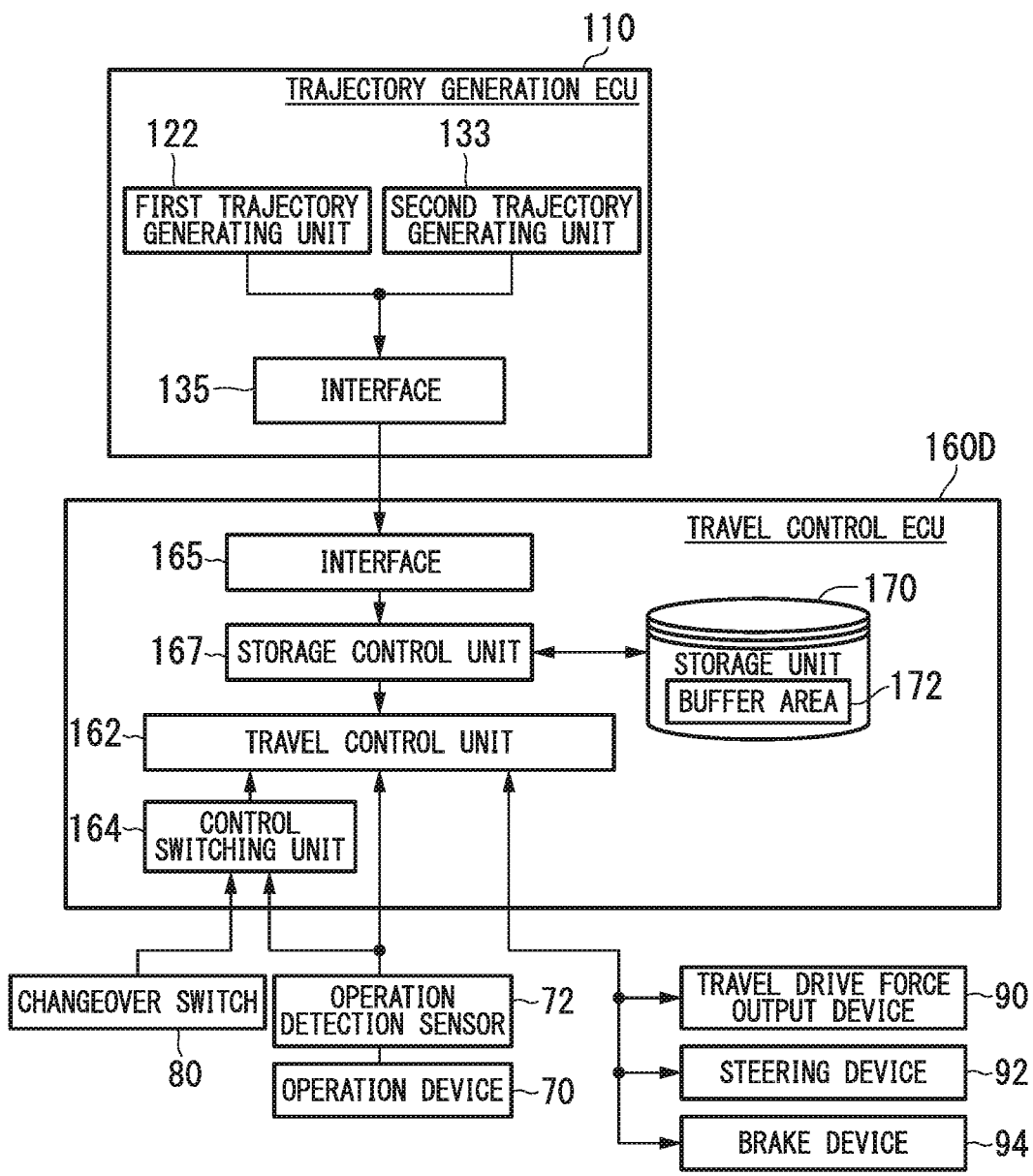
FIG. 20 is a diagram illustrating an example of a configuration of a vehicle control system according to a fourth embodiment.

FIG. 20 is a diagram illustrating an example of a configuration of the vehicle control system 100 according to the fourth embodiment. The travel control ECU 160D according to the fourth embodiment further includes a storage control unit 167 in addition to the travel control unit 162, the control switching unit 164, the interface 165, and the storage unit 170 described above. Moreover, the storage unit 170 of the travel control ECU 160D includes a buffer area 172. As illustrated in FIG. 20, the buffer ECU may be omitted.

The storage control unit 167 receives trajectory data from the trajectory generation ECU 110 via the interface 165 and writes the trajectory data in the buffer area 172. The storage control unit 167 reads trajectory data, for which a predetermined period has elapsed from the time at which the trajectory data was received, sequentially from the buffer area 172. Moreover, the storage control unit 167 determines (detects) whether an abnormality has occurred in the trajectory data received from the trajectory generation ECU 110 and stops a writing process when an abnormality occurred. In a period in which the writing process is stopped, the storage control unit 167 continuously reads the trajectory data for which a predetermined period has elapsed. In this way, the travel control unit 162 controls each control target on the basis of the trajectory data in which an abnormality has not occurred. As a result, the vehicle control system 100 according to the fourth embodiment can terminate an automatic driving mode more smoothly similarly to the first to third embodiments described above.

While modes for implementing the present invention have been described using embodiments, the present invention is not limited to these embodiments and various modifications and substitutions can be added without departing from the scope of the present invention.

REFERENCE SIGNS LIST

20 Finder
30 Radar
40 Camera
50 Navigation device
60 Vehicle sensor
70 Operation device
72 Operation detection sensor
80 Changeover switch
90 Travel drive force output device
92 Steering device
94 Brake device
100 Vehicle control system
110 Trajectory generation ECU
112 Host vehicle position recognition unit
114 Outside world recognition unit
116 Action plan generation unit
120 Travel mode determining unit
122 First trajectory generating unit
130 Lane change control unit
131 Target position setting unit
132 Lane changeability determining unit
133 Second trajectory generating unit
140 Storage unit
150 Buffer ECU
154 Storage control unit
156 Storage unit
158 Buffer area
160 Travel control ECU
162 Travel control unit
164 Control switching unit
170 Storage unit
M Host vehicle

What is claim is:

1. A vehicle control system comprising:
a first device that generates trajectory data indicating a future trajectory of a host vehicle and outputs the generated trajectory data;
a second device that controls at least one of acceleration/deceleration and steering of the host vehicle on the basis of the trajectory data generated by the first device; and
a third device that receives the trajectory data generated by the first device and writes the received trajectory data in a storage unit thereof, the third device being a device separate from at least the first device,
wherein
it is detected whether an abnormality occurs on the basis of content of the trajectory data output by the first device and received by the third device, and when the abnormality occurs in the trajectory, the second device controls at least one of the acceleration/deceleration and the steering of the host vehicle on the basis of the trajectory data which has been received by the third device and written in the storage unit before the abnormality occurred, and
wherein
the third device extends a trajectory of the trajectory data which has been received by the third device and written in the storage unit before the abnormality occurred, thereby generating an additional trajectory data indicating a future trajectory later than a target future time point of the trajectory on the basis of the trajectory data received from the first device, and the third device outputs the generated additional trajectory data to the second device in addition to the trajectory data received from the first device when the abnormality has occurred in the trajectory data received from the first device.

2. The vehicle control system according to claim 1, wherein the third device stops storing the received trajectory data in the storage unit when it is detected that the abnormality has occurred in the trajectory data received from the first device.

3. The vehicle control system according to claim 1, wherein the third device stops receiving the trajectory data generated by the first device when it is detected that the abnormality has occurred in the trajectory data received from the first device.

4. The vehicle control system according to claim 2, wherein the third device relays the trajectory data output from the first device to output the trajectory data to the second device and detects the occurrence of the abnormality in the trajectory data on the basis of a content or a presence of the relayed trajectory data.

5. The vehicle control system according to claim 1, wherein the first device, the second device, and the third device are connected via a communication line via which information being transmitted can be referred by a plurality of devices, the first device outputs the trajectory data to the communication line, the second device controls at least one of the acceleration/deceleration and the steering of the host vehicle on the basis of the trajectory data transmitted via the communication line, and the third device receives the trajectory data transmitted via the communication line, stores the received trajectory data in the storage unit, and outputs the trajectory data stored in the storage unit to the communication line when the abnormality has occurred in the received trajectory data.

6. The vehicle control system according to claim 5, wherein
the third device appends information indicating that a priority of the trajectory data stored in the storage unit is higher than a priority of information that the first device outputs to the communication line and outputs the trajectory data to the communication line.

7. The vehicle control system according to claim 1, wherein when the abnormality has not occurred in the trajectory data received from the first device, the third device continuously receives the trajectory data output from the first device and overwrites the received trajectory data in a predetermined area of the storage unit.

8. The vehicle control system according to claim 1, wherein
the first device and the third device include volatile memories, and the volatile memory included in the first device has a larger storage capacity than the volatile memory included in the third device.

9. The vehicle control system according to claim 1, wherein the second device can switch to a manual driving mode in which a driver performs manual driving and an automatic driving mode in which a vehicle travels in a state in which the driver does not perform a driving operation or a state in which a driving operation amount is smaller or a driving operation frequency is lower than in the manual driving mode, and when the abnormality has occurred in the trajectory data output by the first device in the automatic driving mode, the second device is switched from the automatic driving mode to the manual driving mode and the driver is notified of the switching.

10. The vehicle control system according to claim 9, wherein
the second device decelerates the host vehicle when it is determined that a driving operation has not been input from the driver for a predetermined period from a time when the notification of switching from the automatic driving mode to the manual driving mode is sent.

* * * * *